US012412520B2

(12) United States Patent
Lee et al.

(10) Patent No.: US 12,412,520 B2
(45) Date of Patent: Sep. 9, 2025

(54) DISPLAY DEVICE, DRIVE CONTROLLER, AND DISPLAY DEVICE DRIVING METHOD

(71) Applicant: Samsung Display Co., LTD., Yongin-si (KR)

(72) Inventors: Donggyu Lee, Yongin-si (KR); Sehyuk Park, Yongin-si (KR); Jin-Wook Yang, Yongin-si (KR); Jae-Hyeon Jeon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/755,073

(22) Filed: Jun. 26, 2024

(65) Prior Publication Data

US 2025/0104608 A1 Mar. 27, 2025

(30) Foreign Application Priority Data

Sep. 22, 2023 (KR) ........................ 10-2023-0127019

(51) Int. Cl.
*G09G 3/32* (2016.01)
*G09G 3/3225* (2016.01)

(52) U.S. Cl.
CPC ............. *G09G 3/32* (2013.01); *G09G 3/3225* (2013.01); *G09G 2310/0286* (2013.01); *G09G 2310/08* (2013.01); *G09G 2320/0247* (2013.01); *G09G 2320/0276* (2013.01); *G09G 2330/021* (2013.01); *G09G 2330/028* (2013.01); *G09G 2360/16* (2013.01)

(58) Field of Classification Search
CPC ................. G09G 93/32; G09G 3/3225; G09G 2310/0286; G09G 2310/08; G09G 2320/0247; G09G 2320/0276; G09G 2330/021; G09G 2330/028; G09G 2360/16
See application file for complete search history.

(56) References Cited

U.S. PATENT DOCUMENTS

| | | | | |
|---|---|---|---|---|
| 10,565,953 | B2 | 2/2020 | Kim et al. | |
| 11,056,049 | B2 | 7/2021 | Kim et al. | |
| 11,158,266 | B2 | 10/2021 | Baek et al. | |
| 11,423,834 | B2 * | 8/2022 | Park | G09G 3/3233 |
| 12,165,594 | B2 * | 12/2024 | Lee | G09G 3/3258 |

(Continued)

FOREIGN PATENT DOCUMENTS

| | | |
|---|---|---|
| KR | 20210013509 A | 2/2021 |
| KR | 20220115765 A | 8/2022 |

(Continued)

*Primary Examiner* — Antonio Xavier
(74) *Attorney, Agent, or Firm* — CANTOR COLBURN LLP

(57) ABSTRACT

A display device includes a display panel that includes a plurality of pixels and displays an image corresponding to each of a plurality of frames, and a drive controller that receives an image signal and drives the plurality of frames at a plurality of driving frequencies. The drive controller includes a representative frequency calculator, a compensation signal calculator, and a data compensation unit that receives an image signal and outputs a compensation data signal by adding a gray of the image signal and a gray value based on a data correction lookup table in which the gray value is stored. Luminance of the image is controlled based on the compensation signal and the compensation data signal.

28 Claims, 16 Drawing Sheets

(56) References Cited

U.S. PATENT DOCUMENTS

| | | | | |
|---|---|---|---|---|
| 2013/0038621 | A1* | 2/2013 | Choi | G06T 1/20 345/589 |
| 2021/0407436 | A1 | 12/2021 | Park et al. | |
| 2022/0199025 | A1* | 6/2022 | Hong | G09G 3/3258 |
| 2022/0392382 | A1 | 12/2022 | Park et al. | |
| 2023/0117873 | A1 | 4/2023 | Kim et al. | |
| 2023/0138307 | A1 | 5/2023 | Lin | |
| 2023/0386390 | A1* | 11/2023 | Park | G09G 3/3233 |
| 2024/0046851 | A1* | 2/2024 | Liu | G09G 3/3648 |

FOREIGN PATENT DOCUMENTS

| | | | |
|---|---|---|---|
| KR | 102529152 | B1 | 5/2023 |
| KR | 102554967 | B1 | 7/2023 |

* cited by examiner

FIG. 9

| | FP1 | | FP2 | | FP3 | | FP4 | | FP5 | | FP6 | | FP7 | | FP8 | | FP9 | | | | FP10 | | | | FP11 | | | | FP12 | | | FP13 | | | FP14 | | |
|---|---|---|---|---|---|---|---|---|---|---|---|---|---|---|---|---|---|---|---|---|---|---|---|---|---|---|---|---|---|---|---|---|---|---|---|---|---|
| Sync | | | | | | | | | | | | | | | | | | | | | | | | | | | | | | | | | | | | | |
| CYC | | | | | | | | | | | | | | | | | | | | | | | | | | | | | | | | | | | | | |
| W/H | W | H | W | H | W | H | W | H | W | H | W | H | W | H | W | H | W | H | H | H | W | H | H | H | W | H | H | H | W | H | H | W | H | H | W | H | H |
| cycle_cnt | 0 | 1 | 0 | 1 | 0 | 1 | 0 | 1 | 0 | 1 | 0 | 1 | 0 | 1 | 0 | 1 | 0 | 1 | 2 | 3 | 0 | 1 | 2 | 3 | 0 | 1 | 2 | 3 | 0 | 1 | 2 | 0 | 1 | 2 | 0 | 1 | 2 |
| DF | | 240 | | 240 | | 240 | | 240 | | 240 | | 240 | | 240 | | 240 | | | | 120 | | | | 120 | | | | 120 | | | 160 | | | 160 | | | 160 |
| SR0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 | 0 | 0 | 0 | 1 | 0 | 0 | 1 | 0 | 0 | 1 | 0 | 0 |
| SR1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 | 0 | 0 | 0 | 1 | 0 | 0 | 1 | 0 | 0 | 1 | 0 |
| SR2 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 | 0 | 0 | 0 | 1 | 0 | 0 | 1 | 0 | 0 | 1 |
| SR3 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 | 0 | 0 | 0 | 1 | 0 | 0 | 1 | 0 | 0 |
| SR4 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 | 0 | 0 | 0 | 1 | 0 | 0 | 1 | 0 |
| SR5 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 | 0 | 0 | 0 | 1 | 0 | 0 | 1 |
| SR6 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 | 0 | 0 | 0 | 1 | 0 | 0 |
| SR7 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 | 0 | 0 | 0 | 1 | 0 |
| SR8 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 | 0 | 0 | 0 | 1 |
| SR9 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 | 0 | 0 | 0 |
| SR10 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 | 0 | 0 |
| SR11 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 | 0 |
| SR12 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 | 1 |
| SR13 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 | 0 |
| SR14 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 | 0 |
| SR15 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 1 | 0 | 0 | 0 | 1 | 0 |
| PFI | 195 | 138 | 195 | 138 | 195 | 138 | 195 | 138 | 195 | 138 | 195 | 138 | 195 | 138 | 195 | 138 | 195 | 138 | 95 | 65 | 143 | 101 | 70 | 49 | 132 | 95 | 66 | 46 | 131 | 94 | 65 | 145 | 102 | 72 | 149 | 106 | 73 |
| FI | | | | 138 | | 138 | | 138 | | 138 | | 138 | | 138 | | 138 | | | | 138 | | | | 65 | | | | 49 | | | 46 | | | 65 | | | 72 |

FIG. 10
MI
Frequency Weight Coefficient
100
80
60
40
20
C[0]
C[1]
C[2]
C[3]
C[4]
C[5]
C[6]
C[7]
C[8]
C[9]
C[10]
C[11]
C[12]
C[13]
C[14]
C[15]

| Cycle_cnt \ FI | 138 | 72 | 45 | ... | <40 |
|---|---|---|---|---|---|
| 0 | a0 | b0 | c0 | ... | d |
| 1 | a1 | b1 | c1 | ... | |
| 2 | a2 | b2 | c2 | ... | |
| 3 | a3 | b3 | c3 | ... | |
| 4 | a4 | b4 | c4 | ... | |
| ... | ... | ... | ... | ... | |
| 30 | a30 | b30 | c30 | ... | |
| 31 | a31 | b31 | c31 | ... | |

DISPLAY DEVICE, DRIVE CONTROLLER, AND DISPLAY DEVICE DRIVING METHOD

This application claims priority to Korean Patent Application No. 10-2023-0127019, filed on Sep. 22, 2023, and all the benefits accruing therefrom under 35 U.S.C. § 119, the content of which in its entirety is herein incorporated by reference.

BACKGROUND

1. Field

The present invention relates to a display device, and more particularly to a display device with improved display quality, a drive controller, and a display device driving method.

2. Description of Related Art

Various electronic devices such as a television, a mobile phone, a tablet computer, a navigation system, and a game console are being developed. In particular, because portable display devices operate by using a battery, various techniques for reducing power consumption are being developed.

The techniques for reducing power consumption include a technique for decreasing a driving frequency of a display device. For example, the power consumption of the display device may be reduced by decreasing the driving frequency in a specific operating environment in which a still image is displayed.

SUMMARY

An embodiment of the invention provides a display device with improved display quality, a drive controller, and a display device driving method.

According to an embodiment, a display device may include a display panel that includes a plurality of pixels and displays an image corresponding to each of a plurality of frames, and a drive controller that receives an image signal and drives the plurality of frames at a plurality of driving frequencies, respectively. The drive controller may include a representative frequency calculator that outputs a representative frequency based on "n" driving frequencies of frames preceding one frame from among the plurality of frames, a compensation signal calculator that outputs a compensation signal based on the representative frequency and a counting number in the one frame, and a data compensation unit that receives the image signal and outputs a compensation data signal by adding a gray of the image signal and a gray value based on a data correction lookup table in which the gray value is stored, and luminance of the image may be controlled based on the compensation signal and the compensation data signal.

In an embodiment, the gray value according to the representative frequency and the gray of the image signal may be stored in the data correction lookup table.

In an embodiment, the gray value according to the gray of the image signal and a previous driving frequency of a frame preceding one frame from among the plurality of frames may be stored in the data correction lookup table.

In an embodiment, when the previous driving frequency has a first frequency, the gray value may have a first gray value, and the compensation data signal may be output based on the first gray value. When the previous driving frequency has a second frequency higher than the first frequency, the gray value may have a second gray value, and the compensation data signal may be output based on the second gray value. The second gray value may be smaller than the first gray value.

In an embodiment, the data correction lookup table may be provided in plurality, and the plural data correction lookup table may be provided depending on a luminance value of the image signal.

In an embodiment, when the gray of the image signal is a gray not stored in the data correction lookup table, the data compensation unit may calculate the gray value by using an interpolation method.

In an embodiment, the representative frequency may be calculated based on a synchronization signal defining a start of each of the plurality of frames and a counting signal obtained by counting the plurality of frames at a given period, and the counting number may be output based on the counting signal.

In an embodiment, the representative frequency calculator may include a plurality of shift registers receiving the synchronization signal and the counting signal, the plurality of shift registers may be electrically connected in series, and when one shift register among the plurality of shift registers receives the counting signal, the one shift register may transmit an output value to another shift register connected to the one shift register.

In an embodiment, the representative frequency may be calculated by multiplying output values of the plurality of shift registers and different weights in a one-to-one correspondence.

In an embodiment, the display device may further include a voltage generator that receives the compensation signal, generates a voltage whose voltage level is adjusted based on the compensation signal, and provides the voltage to each of the plurality of pixels.

In an embodiment, as the counting number increases, the voltage level of the voltage may increase.

In an embodiment, when the driving frequency has a first frequency, the voltage may have a first voltage level, and when the driving frequency has a second frequency lower than the first frequency, the voltage may have a second voltage level higher than the first voltage level.

In an embodiment, the display device may further include a driving circuit that receives the compensation signal, generates an emission signal whose pulse width is adjusted depending on the compensation signal, and provides the emission signal to each of the plurality of pixels.

In an embodiment, as the counting number increases, a width of the pulse width may become narrower.

In an embodiment, the drive controller may further include storage that stores the data correction lookup table.

According to an embodiment, a drive controller may include a representative frequency calculator, a compensation signal calculator, and a data compensation unit. The drive controller may receive an image signal corresponding to each of a plurality of frames, each of which is driven at a driving frequency. The representative frequency calculator may output a representative frequency based on "n" driving frequencies of frames preceding one frame from among the plurality of frames. The compensation signal calculator may output a compensation signal based on the representative frequency and a counting number in the one frame. Based on a data correction lookup table in which a gray value according to a gray of the image signal is stored, the data compensation unit may add the gray of the image signal and the gray value to output a compensation data signal.

In an embodiment, the gray value according to the representative frequency and the gray of the image signal may be stored in the data correction lookup table.

In an embodiment, the gray value according to the gray of the image signal and a previous driving frequency of a frame preceding one frame from among the plurality of frames may be stored in the data correction lookup table.

In an embodiment, when the previous driving frequency has a first frequency, the gray value may have a first gray value, and the compensation data signal may be output based on the first gray value. When the previous driving frequency has a second frequency higher than the first frequency, the gray value may have a second gray value, and the compensation data signal may be output based on the second gray value. The second gray value may be smaller than the first gray value.

In an embodiment, the drive controller may further include storage configured to store the data correction lookup table.

According to an embodiment, a method of driving a display device which displays an image based on an image signal corresponding to each of a plurality of frames may include outputting a representative frequency based on "n" driving frequencies of frames preceding one frame from among the plurality of frames, outputting a compensation signal based on the representative frequency and a counting number in the one frame, outputting a compensation data signal obtained by adding a gray of the image signal and a gray value according to the gray of the image signal, based on a data correction lookup table in which the gray value is stored, wherein luminance of the image may be controlled based on the compensation signal and the compensation data signal.

In an embodiment, the gray value according to the representative frequency and the gray of the image signal may be stored in the data correction lookup table.

In an embodiment, the gray value according to the gray of the image signal and a previous driving frequency of a frame preceding one frame one frame from among the plurality of frames may be stored in the data correction lookup table.

In an embodiment, the outputting of the compensation data signal may include outputting the compensation data signal based on a first gray value which the gray value has, when the previous driving frequency has a first frequency, and outputting the compensation data signal based on a second gray value which is smaller than the first gray value and the gray value has, when the previous driving frequency has a second frequency higher than the first frequency.

In an embodiment, the method may further include receiving the compensation signal, and adjusting a voltage level of a voltage to be provided to each of the plurality of pixels based on the compensation signal.

In an embodiment, as the counting number increases, the voltage level of the voltage may increase.

In an embodiment, the method may further include receiving the compensation signal, and adjusting a pulse width of an emission signal to be provided to each of the plurality of pixels based on the compensation signal.

In an embodiment, as the counting number increases, a width of the pulse width may become narrower.

BRIEF DESCRIPTION OF THE FIGURES

The above and other objects and features of the present disclosure will become apparent by describing in detail embodiments thereof with reference to the accompanying drawings.

FIG. 9 is a block diagram which illustrates an operation of a representative frequency calculator, according to an embodiment.

DETAILED DESCRIPTION

Figure 1:
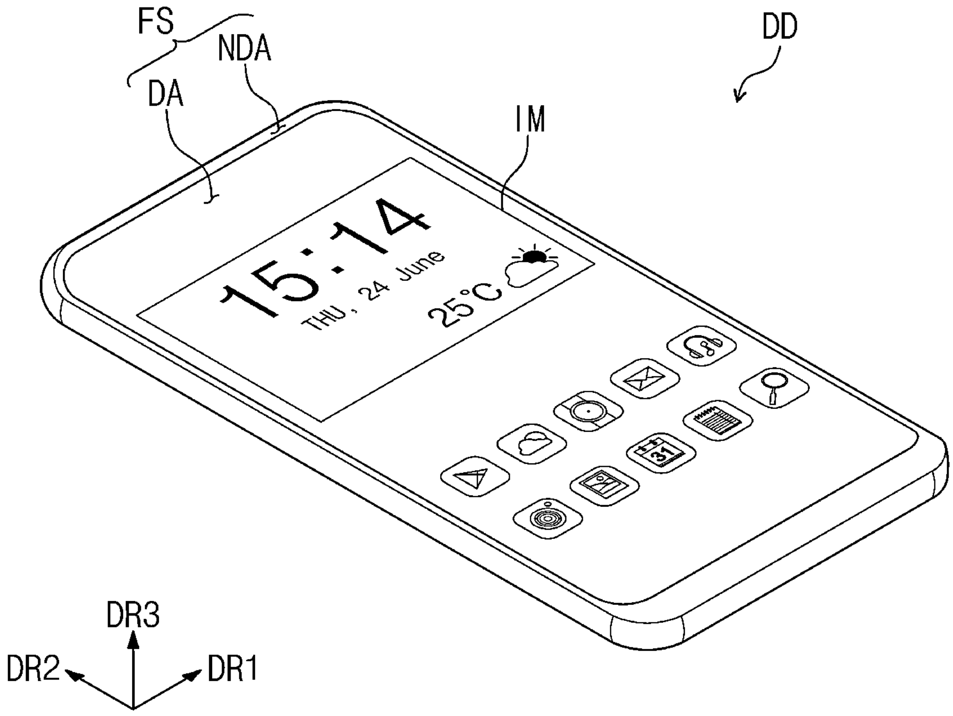
FIG. 1 is a perspective view illustrating a display device, according to an embodiment.

In the specification, the expression that a first component (or an area, a layer, a part, or a portion) is "on", "connected to", or "coupled to" a second component means that the first component is directly on/connected to/coupled to the second component or means that a third component is interposed therebetween.

The same reference numerals refer to the same components. Also, in drawings, the thickness, ratio, and dimension of components are exaggerated for effectiveness of description of the invention. The term "and/or" includes one or more combinations in each of which associated elements are defined.

Although the terms "first", "second", etc. may be used to describe various components, the components should not be construed as being limited by the terms. The terms are only used to distinguish one component from another component. For example, without departing from the scope and spirit of the invention, a first component may be referred to as a "second component", and similarly, the second component may be referred to as the "first component". The articles "a", "an", and "the" are singular in that they have a single referent, but the use of the singular form in the specification should not preclude the presence of more than one referent.

Also, the terms “under”, “below”, “on”, “above”, etc. are used to describe the correlation of components illustrated in drawings. The terms that are relative in concept are described based on a direction shown in drawings. The expressions “below”, “beneath”, “lower”, “above” that are spatially relative terms, as illustrated in the drawings, may be used to easily describe a correlation of one element or component and another element and component. The spatially relative terms should be understood as terms including, in addition to directions illustrated in the drawings, different directions of an element during an operation thereof. Throughout the specification, the same reference numerals denote the same components.

The embodiments described in the specification will be described with reference to views that are ideal schematic views of the invention. Accordingly, forms of the exemplary views may be modified depending on a manufacturing technology and/or an allowable error. Accordingly, the embodiments of the invention are not limited to the illustrated specific forms but include changes in the shapes formed according to the manufacturing process. Accordingly, the areas exemplified in the drawings have schematic attributes, and the shape of the areas exemplified in the drawings are provided to exemplify the specific shapes of the areas and are not intended to limit the scope of the invention.

The expression that an element or layer is “on”, “connected to”, or “coupled to” another element or layer means not only that the element or layer is directly on another element or layer but also that a third layer or element may be interposed therebetween. Meanwhile, the expression that an element is “directly on” another element means that no third element or layer is interposed therebetween. The expression “and/or” includes each of items and all combination of one or more of them.

It will be further understood that the terms “comprises”, “includes”, “have”, etc. specify the presence of stated features, numbers, steps, operations, elements, components, or a combination thereof but do not preclude the presence or addition of one or more other features, numbers, steps, operations, elements, components, or a combination thereof.

Unless otherwise defined, all terms (including technical terms and scientific terms) used in the specification have the same meaning as commonly understood by one skilled in the art to which the invention belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the invention will be described with reference to the drawings.

FIG. 1 is a perspective view of a display device, according to an embodiment.

In an embodiment and referring to FIG. 1, a display device DD may have a shape where short sides (or edges) extend in a first direction DR1 and long sides (or edges) extend in a second direction DR2 intersecting the first direction DR1. However, the shape of the display device DD is not limited thereto. For example, the display device DD may be implemented in various shapes.

In an embodiment, the display device DD may be a small and medium-sized electronic device such as a mobile phone, a tablet, an automotive navigation system, or a game console, as well as a large-sized electronic device such as a television or a monitor. The above examples are provided only as an embodiment, and the display device DD is capable of being applied to any other electronic device(s) without departing from the scope and spirit of the invention.

In an embodiment, as illustrated in FIG. 1, the display device DD may display an image IM on a display surface FS which is directed parallel to each of the first direction DR1 and the second direction DR2, so as to face a third direction DR3 intersecting the first direction DR1 and the second direction DR2. The display surface FS on which the image IM is displayed may correspond to a front surface of the display device DD.

In an embodiment, the display surface FS of the display device DD may be divided into a plurality of areas. A display area DA and a non-display area NDA may be defined on the display surface FS of the display device DD.

In an embodiment, the display area DA may be an area where the image IM is displayed, and the user may visually perceive the image IM through the display area DA. A shape of the display area DA may be defined substantially by the non-display area NDA. However, the above definition is provided as an example, and the non-display area NDA may be disposed adjacent to only one side of the display area DA or may be omitted. The display device DD may include various embodiments and is not limited to any one embodiment.

In an embodiment, the non-display area NDA that is an area adjacent to the display area DA may be an area where the image IM is not displayed. A bezel area of the display device DD may be defined by the non-display area NDA.

In an embodiment, the non-display area NDA may surround the display area DA. However, this is illustrated as an example. The non-display area NDA may be disposed adjacent to only a portion of the border of the display area DA or may be omitted.

Figure 2:
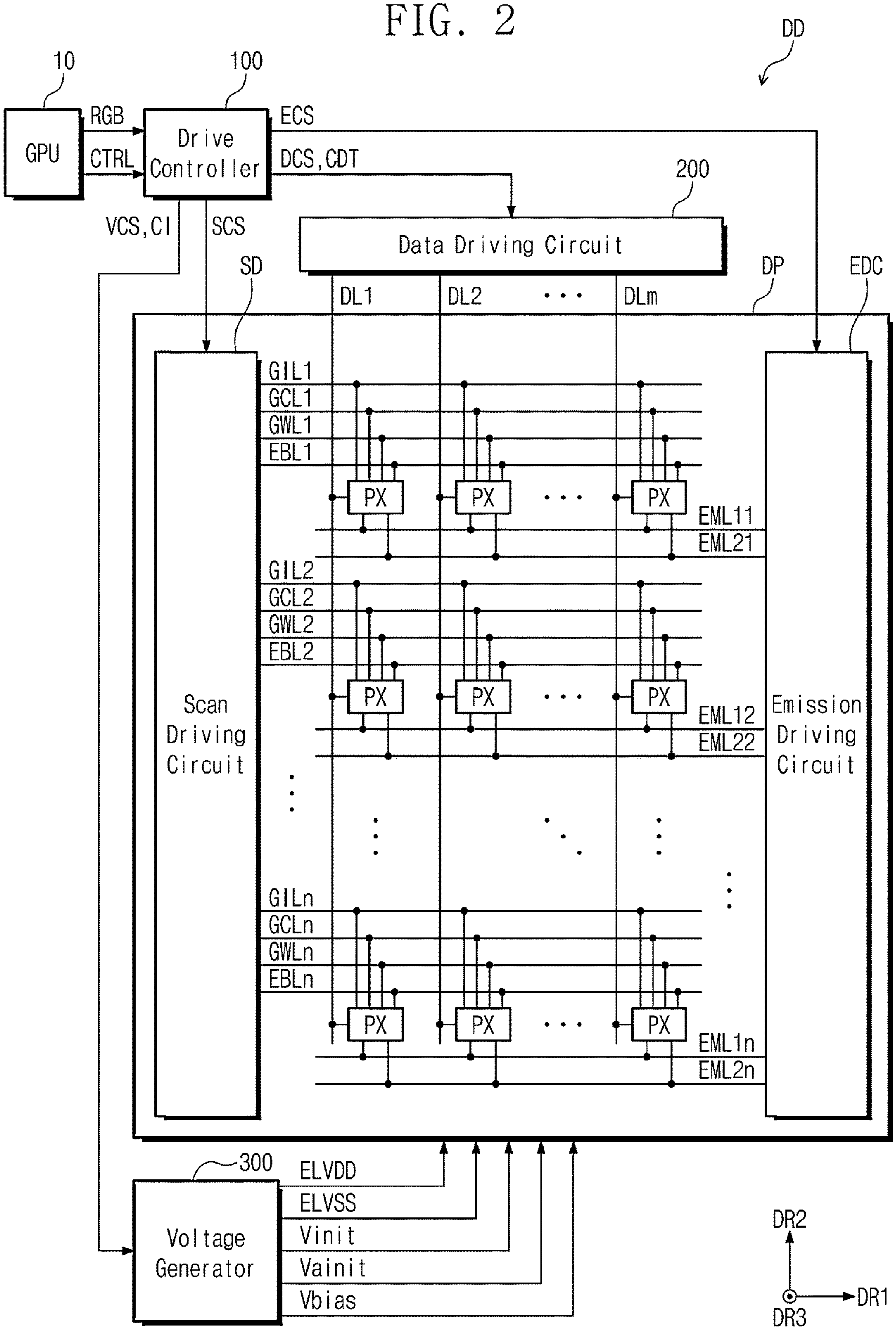
FIG. 2 is a block diagram of a display device, according to an embodiment.

FIG. 2 is a block diagram of a display device, according to an embodiment.

In an embodiment and referring to FIG. 2, the display device DD includes a host processor 10, a display panel DP, a drive controller 100, a data driving circuit 200, and a voltage generator 300.

In an embodiment, the host processor 10 may be a graphic processing unit (GPU). The host processor 10 may provide an image signal RGB and a control signal CTRL to the drive controller 100. The host processor 10 may control a display operation of the display panel DP through the image signal RGB and the control signal CTRL.

In an embodiment, the display panel DP may display the image IM (refer to FIG. 1) corresponding to each of a plurality of frames. The display panel DP according to an embodiment may be a light emitting display panel but is not limited thereto. In an embodiment, the display panel DP may be an organic light emitting display panel, a quantum dot light emitting display panel, a micro-LED display panel, or a nano-LED display panel. A light emitting layer of the organic light emitting display panel may include an organic light emitting material. A light emitting layer of the quantum dot light emitting display panel may include a quantum dot, a quantum rod, or the like. A light emitting layer of the micro-LED display panel may include a micro-LED. A light emitting emission layer of the nano-LED display panel may include a nano-LED.

In an embodiment, the drive controller 100 may drive a plurality of frames at a plurality of driving frequencies. The drive controller 100 may receive the image signal RGB and the control signal CTRL. The drive controller 100 may generate a compensation data signal CDT by converting a data format of the image signal RGB in compliance with the specification for an interface with the data driving circuit 200 and compensating for the image signal RGB of the converted data format. The drive controller 100 may output a scan control signal SCS, a data control signal DCS, an emission driving control signal ECS, a voltage control signal VCS, and a compensation signal CI.

In an embodiment, the data driving circuit 200 may receive the data control signal DCS and the compensation data signal CDT from the drive controller 100. The data driving circuit 200 may convert the compensation data signal CDT into a data voltage Vdata (refer to FIG. 3) and may output the data voltage Vdata (refer to FIG. 3) to each of a plurality of data lines DL1 to DLm. The data voltage Vdata (refer to FIG. 3) may be an analog voltage corresponding to a gray value of the compensation data signal CDT.

In an embodiment, the data driving circuit 200 may output the data voltage Vdata (refer to FIG. 3) corresponding to the compensation data signal CDT to each of the data lines DL1 to DLm during a driving interval "A" (refer to FIG. 4) of one frame.

In an embodiment, the voltage generator 300 may receive the voltage control signal VCS and the compensation signal CI from the drive controller 100. The voltage generator 300 may generate voltages necessary for the operation of the display panel DP based on the voltage control signal VCS and the compensation signal CI. The voltage generator 300 may provide the voltages to the display panel DP. In an embodiment, the voltages may include a first driving voltage ELVDD, a second driving voltage ELVSS, a first initialization voltage Vinit, a second initialization voltage Vainit, and a reference voltage Vbias.

In an embodiment, a level of the first initialization voltage Vinit may be higher than a voltage level of the second initialization voltage Vainit. However, this is only an example, and the voltage levels of the first initialization voltage Vinit and the second initialization voltage Vainit are not limited thereto. For example, the first initialization voltage Vinit may have the same voltage level as the second initialization voltage Vainit.

In an embodiment, the display panel DP may include scan lines GIL1 to GILn, GCL1 to GCLn, GWL1 to GWLn, and EBL1 to EBLn, emission control lines EML11 to EML1*n* and EML21 to EML2*n*, the data lines DL1 to DLm, and pixels PX. The display panel DP may further include a scan driving circuit SD and an emission driving circuit EDC.

In an embodiment, the scan driving circuit SD may be disposed on a first side of the display panel DP. The scan lines GIL1 to GILn, GCL1 to GCLn, GWL1 to GWLn, and EBL1 to EBLn may extend from the scan driving circuit SD in the first direction DR1.

In an embodiment, the emission driving circuit EDC may be disposed on a second side of the display panel DP. The emission control lines EML11 to EML1*n* and EML21 to EML2*n* may extend from the emission driving circuit EDC in a direction facing away from the first direction DR1.

In an embodiment, the scan lines GIL1 to GILn, GCL1 to GCLn, GWL1 to GWLn, and EBL1 to EBLn and the emission control lines EML11 to EML1*n* and EML21 to EML2*n* may be arranged to be spaced apart from each other in the second direction DR2.

In an embodiment, the data lines DL1 to DLm may extend from the data driving circuit 200 in a direction facing away from the second direction DR2. The data lines DL1 to DLm may be arranged to be spaced apart from each other in the first direction DR1.

In the embodiment illustrated in FIG. 2, the scan driving circuit SD and the emission driving circuit EDC are disposed to face each other with the pixels PX interposed therebetween, but the invention is not limited thereto. For example, the scan driving circuit SD and the emission driving circuit EDC may be disposed adjacent to each other on either the first side or the second side of the display panel DP. In an embodiment, the scan driving circuit SD and the emission driving circuit EDC may be implemented with one circuit.

In an embodiment, the plurality of pixels PX may be electrically connected to the scan lines GIL1 to GILn, GCL1 to GCLn, GWL1 to GWLn, and EBL1 to EBLn, the emission control lines EML11 to EML1*n* and EML21 to EML2*n*, and the data lines DL1 to DLm. Each of the plurality of pixels PX may be electrically connected to 4 scan lines and 2 emission control lines. However, this is an example, and the number of lines connected to each of the plurality of pixels PX is not limited thereto.

In an embodiment, the scan lines GIL1 to GILn, GCL1 to GCLn, GWL1 to GWLn, and EBL1 to EBLn may include the initialization scan lines GIL1 to GILn, the compensation scan lines GCL1 to GCLn, the scan signal lines GWL1 to GWLn, and the emission initialization scan lines EBL1 to EBLn.

In an embodiment, the emission control lines EML11 to EML1*n* and EML21 to EML2*n* may include the first emission control lines EML11 to EML1*n* and the second emission control lines EML21 to EML2*n*.

In an embodiment, each of the plurality of pixels PX may include a light emitting diode ED (refer to FIG. 3) and a pixel circuit unit. The pixel circuit unit may control the emission of the light emitting diode ED (refer to FIG. 3).

In an embodiment, the light emitting diodes ED (refer to FIG. 3) of the plurality of pixels PX may generate lights of different colors. For example, the pixels PX may include red pixels generating a red color light, green pixels generating a green color light, and blue pixels generating a blue color light. A light emitting diode of a red pixel, a light emitting diode of a green pixel, and a light emitting diode of a blue pixel may include light emitting layers of different materials.

In an embodiment, the pixel circuit unit may include at least one transistor and at least one capacitor. This will be described later. The scan driving circuit SD and the emission driving circuit EDC may include transistors formed through the same process as the transistors of the pixel circuit.

In an embodiment, each of the plurality of pixels PX may receive the first driving voltage ELVDD, the second driving voltage ELVSS, the first initialization voltage Vinit, the second initialization voltage Vainit, and the reference voltage Vbias from the voltage generator 300.

In an embodiment, the scan driving circuit SD may receive the scan control signal SCS from the drive controller 100. The scan driving circuit SD may output scan signals to the scan lines GIL1 to GILn, GCL1 to GCLn, GWL1 to GWLn, and EBL1 to EBLn in response to the scan control signal SCS.

In an embodiment, the emission driving circuit EDC may output emission signals to the emission control lines EML11 to EML1*n* and EML21 to EML2*n* in response to the emission driving control signal ECS from the drive controller 100.

In an embodiment, the drive controller 100 may determine a driving frequency and may control the data driving circuit 200, the scan driving circuit SD, and the emission driving circuit EDC based on the determined driving frequency.

Figure 3:
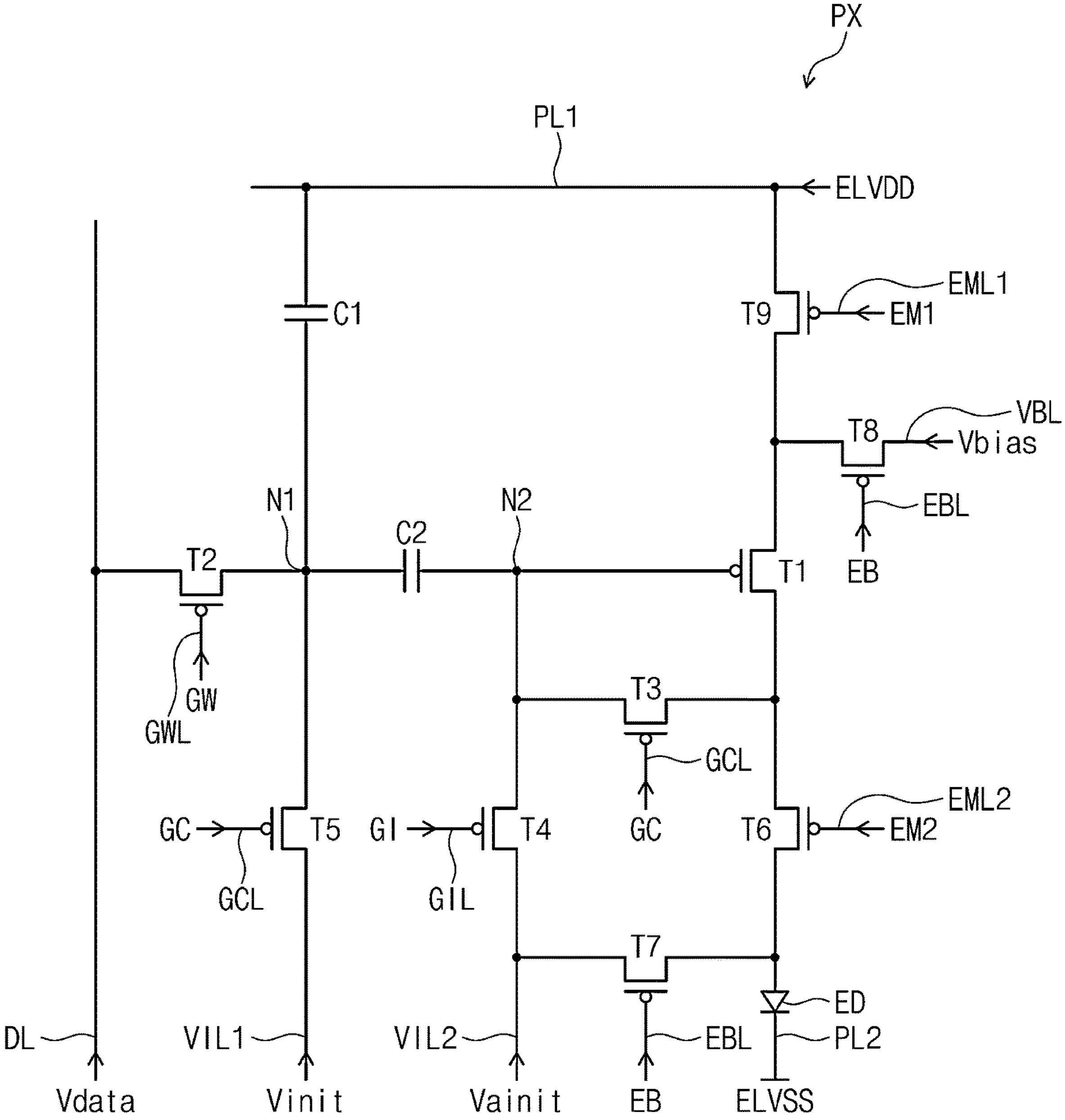
FIG. 3 is an equivalent circuit diagram of a pixel, according to an embodiment.

FIG. 3 is an equivalent circuit diagram of a pixel, according to an embodiment. In the description of FIG. 3, the components that are described with reference to FIG. 2 are marked by the similar reference numerals/signs, and thus, additional description will be omitted to avoid redundancy.

In an embodiment and referring to FIG. 3, the pixel PX may include first to ninth transistors T1, T2, T3, T4, T5, T6, T7, T8, and T9, respectively, capacitors C1 and C2, respectively, and the light emitting diode ED. The pixel PX according to an embodiment may be referred to as having a 9T2C structure. However, this is an example, and the circuit configuration of the pixel PX according to an embodiment may be variously provided without limitation thereto. For example, the pixel PX may have a 10T2C structure.

In an embodiment, each of the first to ninth transistors T1 to T9, respectively, may be a P-type transistor having a low-temperature polycrystalline silicon (LTPS) semiconductor layer. However, this is an example. In an embodiment, at least one of the first to ninth transistors T1 to T9, respectively, may be a P-type transistor, and the others thereof may be N-type transistors having an oxide semiconductor as a semiconductor layer.

In an embodiment, scan lines GIL, GCL, GWL, and EBL may respectively transfer scan signals GI, GC, GW, and EB. The scan lines GIL, GCL, GWL, and EBL may respectively include the initialization scan line GIL, the compensation scan line GCL, the scan signal line GWL, and the emission initialization scan line EBL. The initialization scan line GIL may be one of the initialization scan lines GIL1 to GILn (refer to FIG. 2). The compensation scan line GCL may be one of the compensation scan lines GCL1 to GCLn (refer to FIG. 2). The scan signal line GWL may be one of the scan signal lines GWL1 to GWLn (refer to FIG. 2). The emission initialization scan line EBL may be one of the emission initialization scan lines EBL1 to EBLn (refer to FIG. 2).

In an embodiment, the emission control lines EML1 and EML2 may transfer emission signals EM1 and EM2, respectively. The emission control lines EML1 and EML2 may include the first emission control line EML1 and the second emission control line EML2, respectively. The first emission control line EML1 may be one of the first emission control lines EML11 to EML1*n* (refer to FIG. 2). The second emission control line EML2 may be one of the second emission control lines EML21 to EML2*n* (refer to FIG. 2).

In an embodiment, a data line DL may transfer the data voltage Vdata. The data voltage Vdata may have a voltage level corresponding to the image signal RGB (refer to FIG. 2) input to the display device DD (refer to FIG. 1). A first voltage line PL1 may transfer the first driving voltage ELVDD. A second voltage line PL2 may transfer the second driving voltage ELVSS. A voltage level of the first driving voltage ELVDD may be higher than a voltage level of the second driving voltage ELVSS. A first initialization voltage line VIL1 may transfer the first initialization voltage Vinit. A second initialization voltage line VIL2 may transfer the second initialization voltage Vainit. A reference voltage line VBL may transferred the reference voltage Vbias.

In an embodiment, the first capacitor C1 may be connected between the first voltage line PL1 and a first node N1.

In an embodiment, the second capacitor C2 may be connected between the first node N1 and a second node N2.

In an embodiment, the light emitting diode ED may include a first electrode electrically connected to the first voltage line PL1 through the first transistor T1, the sixth transistor T6, and the ninth transistor T9, and a second electrode connected to the second voltage line PL2. The first electrode of the light emitting diode ED may be referred to as an "anode electrode".

In an embodiment, the first transistor T1 may include a first electrode electrically connected to the first voltage line PL1 through the ninth transistor T9, a second electrode electrically connected to the first electrode of the light emitting diode ED through the sixth transistor T6, and a gate electrode connected to the second node N2. The first transistor T1 may be referred to as a "drive transistor".

In an embodiment, the second transistor T2 may include a first electrode electrically connected to the data line DL, a second electrode electrically connected to the first node N1, and a gate electrode receiving the first scan signal GW. The second transistor T2 may be referred to as a "switching transistor".

In an embodiment, the third transistor T3 may include a first electrode connected to the second node N2, a second electrode electrically connected to the second electrode of the first transistor T1, and a gate electrode receiving the compensation scan signal GC.

In an embodiment, the fourth transistor T4 may include a first electrode electrically connected to the second node N2, a second electrode electrically connected to the second initialization voltage line VIL2, and a gate electrode receiving the initialization scan signal GI.

In an embodiment, the fifth transistor T5 may include a first electrode electrically connected to the first node N1, a second electrode electrically connected to the first initialization voltage line VIL1, and a gate electrode receiving the compensation scan signal GC.

In an embodiment, the sixth transistor T6 may include a first electrode connected to the second electrode of the first transistor T1, a second electrode connected to the first electrodes of the light emitting diode ED, and a gate electrode receiving a second emission signal EM2.

In an embodiment, the seventh transistor T7 may include a first electrode connected to the second initialization voltage line VIL2, a second electrode connected to each of the first electrode of the light emitting diode ED and the second electrode of the sixth transistor T6, and a gate electrode receiving a second scan signal EB. A voltage level of the second initialization voltage Vainit provided from the second initialization voltage line VIL2 may be smaller than a voltage level of the first initialization voltage Vinit.

In an embodiment, the eighth transistor T8 may include a first electrode connected to the first electrode of the first transistor T1 and a second electrode of the ninth transistor T9, a second electrode connected to the reference voltage line VBL, and a gate electrode receiving the second scan signal EB.

In an embodiment, depending on a hysteresis characteristic of the first transistor T1, a driving current of the first transistor T1, which is determined by the data voltage Vdata applied in a current frame, may be affected by the data voltage Vdata applied in a previous frame. However, as the reference voltage Vbias is applied to the first electrode of the first transistor T1 through the eighth transistor T8, the luminance deviation due to the hysteresis characteristic of the first transistor T1 may be controlled. Accordingly, a phenomenon such as flickering may be controlled when the image IM (refer to FIG. 1) is displayed in the display device DD (refer to FIG. 1). This may mean that the display device DD (refer to FIG. 1) with improved display quality is provided.

In an embodiment, the ninth transistor T9 may include a first electrode connected to the first voltage line PL1, the second electrode connected to the first electrode of the first transistor T1, and a gate electrode receiving a first emission signal EM1.

Figure 4A:
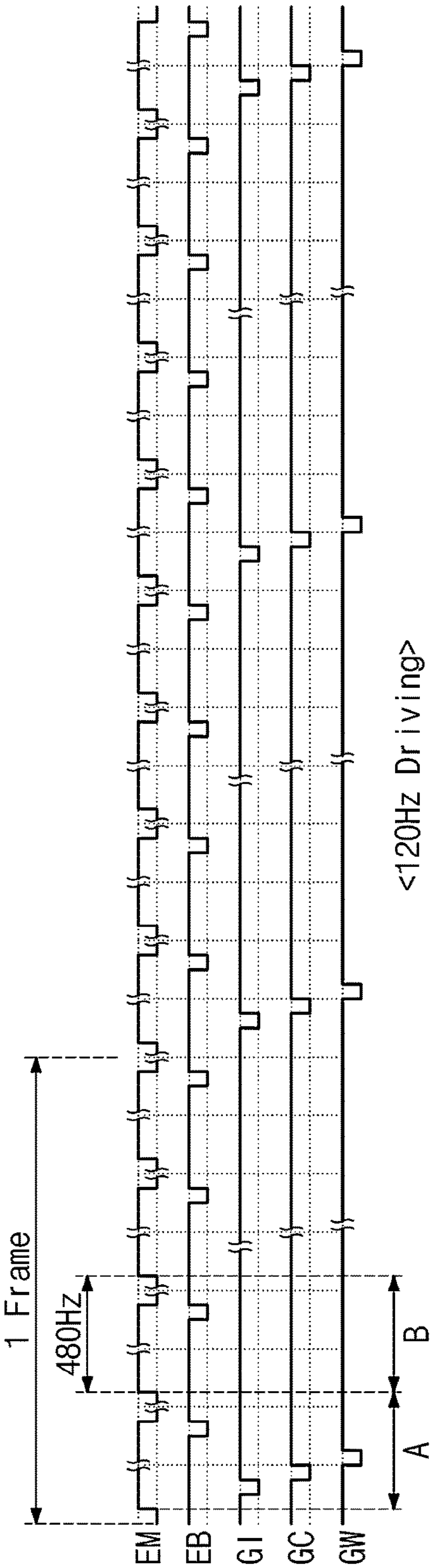
FIG. 4A is a timing diagram of driving signals for driving a pixel, according to an embodiment.
Figure 4B:
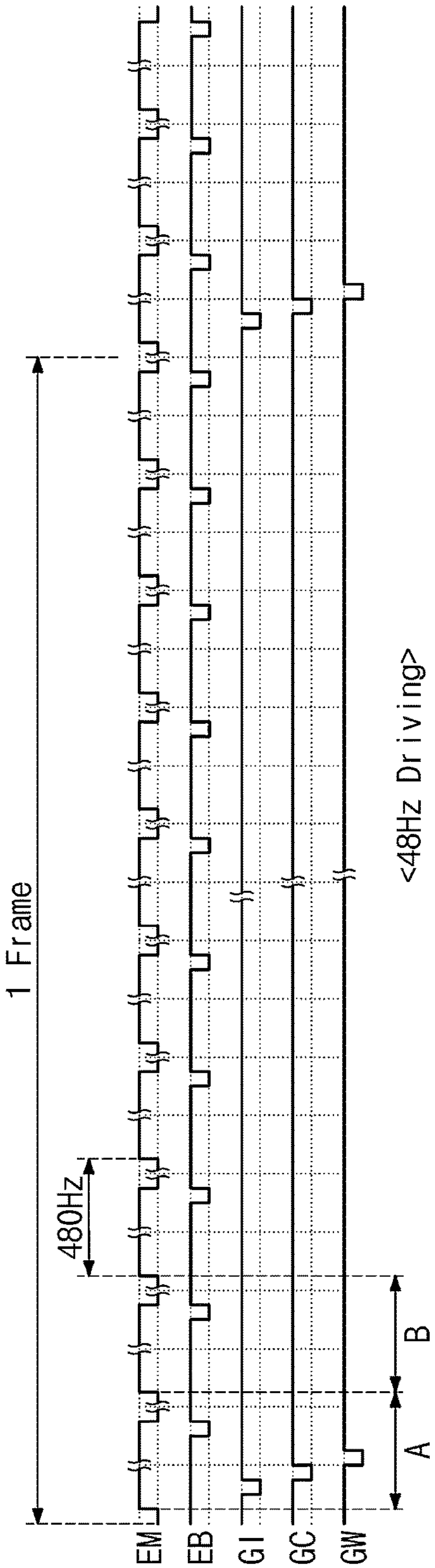
FIG. 4B is a timing diagram of driving signals for driving a pixel, according to an embodiment.

FIGS. 4A and 4B are timing diagrams of driving signals for driving a pixel, according to an embodiment. FIG. 4A shows an example in which the driving frequency is 120 Hz (hertz), and FIG. 4B shows an example in which the driving frequency is 48 Hz.

In an embodiment and referring to FIGS. 2 to 4B, the drive controller 100 may support a variable frequency mode. The host processor 10 may provide the image signal RGB at a variable frame rate every frame. The drive controller 100 supporting the variable frequency mode may provide the compensation data signal CDT to the data driving circuit 200 in synchronization with the variable frame rate and may allow the image IM (refer to FIG. 1) to be displayed at the variable frame rate.

In an embodiment, the scan driving circuit SD may drive a plurality of frames at a plurality of driving frequencies, respectively. When the scan signals output from the scan driving circuit SD are input to each pixel PX, the light emitting diode ED of each pixel PX may emit a light, in this case, a frequency at which the compensation data signal CDT are written may be referred to as a "driving frequency".

In an embodiment, the display panel DP may display the image IM (refer to FIG. 1) every frame period. One frame period (marked by "1 Frame" in drawings) may include the driving interval "A" and at least one scan interval "B". Each of the driving interval "A" and the scan interval "B" may correspond to a time period of about 2.1 ms (millisecond). Each of the driving interval "A" and the scan interval "B" may have a frequency of about 480 Hz. However, this is an example, and the time period of each of the driving interval "A" and the scan interval "B" is not limited thereto. For example, each of the driving interval "A" and the scan interval "B" may correspond to a time period of about 4.2 ms.

In an embodiment, during the driving interval "A", the scan signal lines GWL1 to GWLn, the compensation scan lines GCL1 to GCLn, the initialization scan lines GIL1 to GILn, the emission control lines EML11 to EML1*n* and EML21 to EML2*n*, and the emission initialization scan lines EBL1 to EBLn may be sequentially scanned.

In an embodiment, each of the scan signals GI, GC, GW, and EB and the emission signal EM may have the high level during a given time period and may have the low level during a given time period. In an embodiment, P-type transistors are turned on when relevant signals have the low level. In an embodiment of the present disclosure, below, the description will be given as the first to ninth transistors T1 to T9 included in the pixel PX are P-type transistors. A time period in which the emission signal EM is at the high level may be referred to as a "non-emission time period", and a time period in which the emission signal EM is at the low level may be referred to as an "emission time period".

In an embodiment, the emission signal EM may be one of the first emission signal EM1 (refer to FIG. 3) and the second emission signal EM2 (refer to FIG. 3).

In an embodiment and referring to FIG. 4A, when the host processor 10 generates a frame whose scan rate is 120 Hz, the scan driving circuit SD and the emission driving circuit EDC may be controlled such that one driving interval "A" and three scan intervals "B" are included in one frame. In this embodiment, the display panel DP may operate at the driving frequency of 120 Hz.

In an embodiment and referring to FIG. 4B, when the host processor 10 generates a frame whose scan rate is 48 Hz, the scan driving circuit SD and the emission driving circuit EDC may be controlled such that one driving interval "A" and nine scan intervals "B" are included in one frame. In this embodiment, the display panel DP may operate at the driving frequency of 48 Hz.

However, this is an example, and the operation of the display panel DP, according to an embodiment, is not limited thereto. In an embodiment, when the host processor 10 generates a frame whose scan rate is 240 Hz, the scan driving circuit SD may be controlled such that one driving interval "A" and one scan interval "B" are included frames. In this embodiment, the display panel DP may operate at the frequency of 240 Hz.

According to an embodiment, the display device DD may synchronize the timing to generate the frame of the host processor 10 and the timing to output the frame of the display panel DP. The display device DD may adjust the driving frequency of the display panel DP through the iteration of the scan interval "B". That is, the number of scan intervals "B" may change depending on the driving frequency. The display panel DP may operate at a variable frequency. In an embodiment, the display panel DP may be referred to as operating in the variable frequency mode. For example, the power consumption of the display device DD may be reduced by decreasing the driving frequency of the display device DD in a specific operating environment in which a still image is displayed. Accordingly, the display device DD in which power consumption is reduced may be provided.

Figure 5:
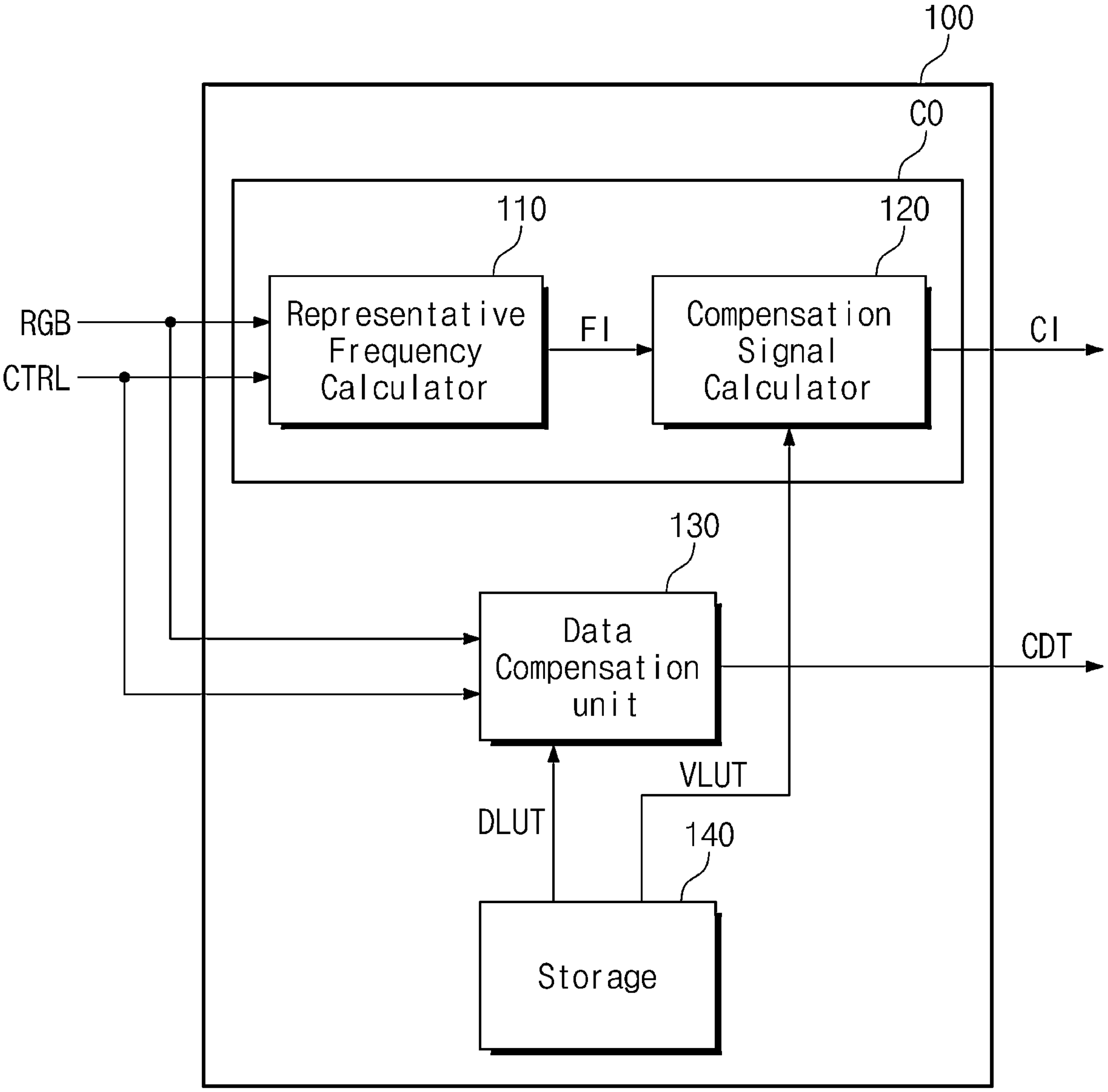
FIG. 5 is a block diagram illustrating a drive controller, according to an embodiment.
Figure 6:
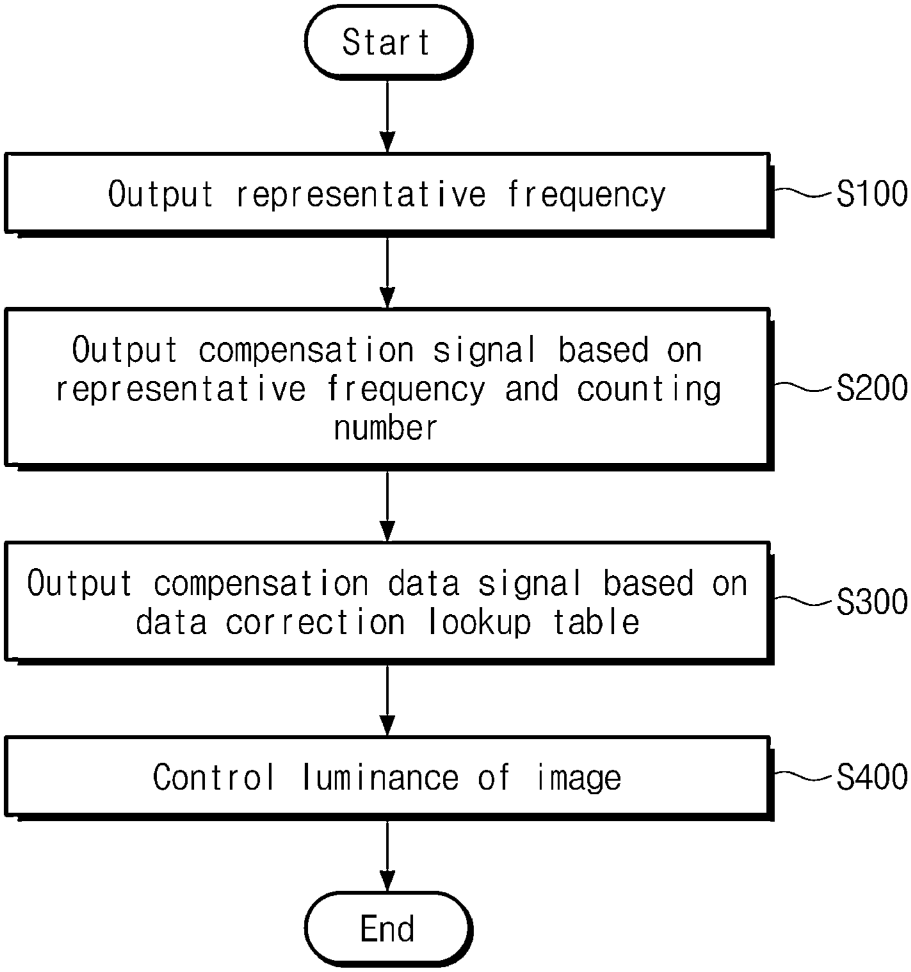
FIG. 6 is a flowchart illustrating a driving method of a display device, according to an embodiment.

FIG. 5 is a block diagram illustrating a drive controller, according to an embodiment, and FIG. 6 is a flowchart illustrating a driving method of a display device, according to an embodiment.

In an embodiment and referring to FIGS. 2, 5, and 6, the drive controller 100 may receive the image signal RGB and the control signal CTRL from the host processor 10. The drive controller 100 may include a compensation signal output unit CO, a data compensation unit 130, and storage 140.

In an embodiment, the compensation signal output unit CO may include a representative frequency calculator 110 and a compensation signal calculator 120.

In an embodiment, the representative frequency calculator 110 may receive the image signal RGB and the control signal CTRL. The representative frequency calculator 110 may output a representative frequency FI based on driving frequencies of "a" frames preceding one frame from among a plurality of frames (S100). Herein, "a" may be a positive integer.

In an embodiment, the compensation signal calculator 120 may receive the representative frequency FI. The compensation signal calculator 120 may output the compensation signal CI based on the representative frequency FI and a counting number in one frame (S200). The counting number may refer to the number of times that a signal is repeated at a given period in one frame. The compensation signal calculator 120 may output the compensation signal CI based on a voltage correction lookup table VLUT (S300). This will be described later.

According to an embodiment, the compensation signal CI may be calculated based on driving frequencies of "a" frames preceding one frame from among a plurality of frames. That is, the compensation signal calculator 120 may output the compensation signal CI in consideration of the influence of the accumulated variable driving frequency. The voltage generator 300 may provide a voltage to the display panel DP based on the compensation signal CI. The display panel DP may drive the plurality of pixels PX based on the voltage to which the influence of the accumulated variable driving frequency is applied. The display device DD may make the luminance deviation of the display panel DP better. Accordingly, the display device DD whose display quality is improved may be provided.

In an embodiment, the data compensation unit 130 may receive the image signal RGB and the control signal CTRL. The data compensation unit 130 may receive a data correction lookup table DLUT in which a gray value is stored. The data compensation unit 130 may output the compensation data signal CDT obtained by adding the gray of the image signal RGB and the gray value based on the data correction lookup table DLUT.

In an embodiment, a plurality of lookup tables may be stored in the storage 140. The plurality of lookup tables may include the data correction lookup table DLUT and the voltage correction lookup table VLUT. The data correction lookup table DLUT may be provided to the data compensation unit 130. The voltage correction lookup table VLUT may be provided to the compensation signal calculator 120.

In an embodiment, gray values according to the gray of the image signal RGB and a previous driving frequency of a frame preceding one frame from among a plurality of frames. The gray values may be experimental values measured through the experiment. This will be described later. The previous driving frequency may be generated based on at least one of the image signal RGB and the control signal CTRL.

In an embodiment, the data correction lookup table DLUT may be provided in plurality depending on a luminance value of the image signal RGB.

In an embodiment, the display panel DP may be driven by the compensation signal CI and the compensation data signal CDT. The luminance of the image IM (refer to FIG. 1) may be controlled based on the compensation signal CI and the compensation data signal CDT (S400).

Figure 7:
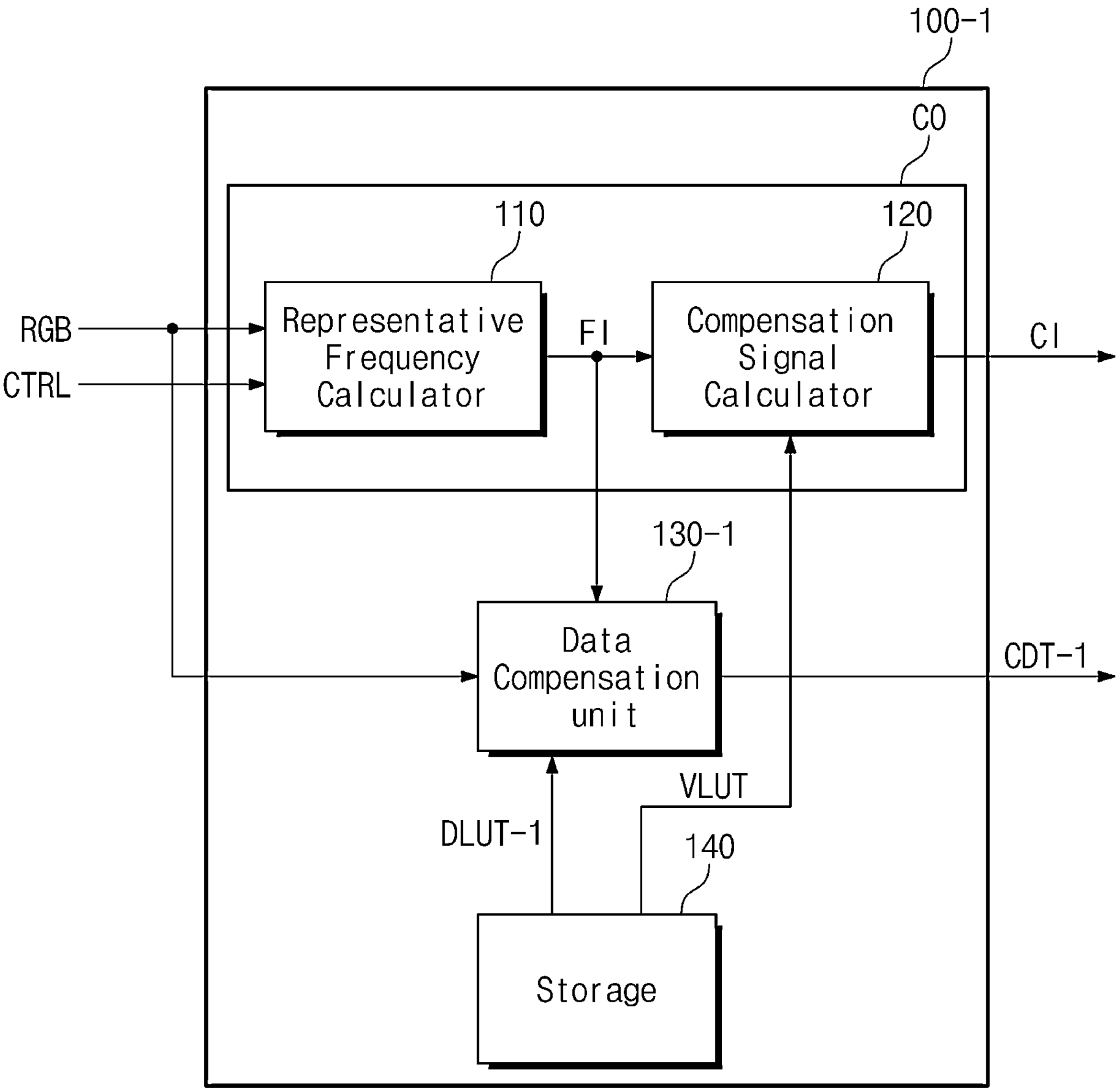
FIG. 7 is a block diagram illustrating a drive controller, according to an embodiment.

FIG. 7 is a block diagram which illustrates a driving controller, according to an embodiment. In the description of FIG. 7, components that are the same as the components described with reference to FIG. 5 are marked by the same reference numerals/signs, and thus, additional description will be omitted to avoid redundancy.

In an embodiment and referring to FIGS. 2 and 7, a drive controller 100-1 may include the compensation signal output unit CO, a data compensation unit 130-1, and the storage 140.

In an embodiment, the data compensation unit 130-1 may receive the image signal RGB and the representative frequency FI. The data compensation unit 130-1 may receive a data correction lookup table DLUT-1 in which a gray value is stored. The data correction lookup table DLUT-1 may include gray values according to representative frequencies FI and grays of the image signal RGB.

In an embodiment, the data compensation unit 130-1 may output a compensation data signal CDT-1 obtained by adding the gray of the image signal RGB and the gray value based on the data correction lookup table DLUT-1.

Figure 8:
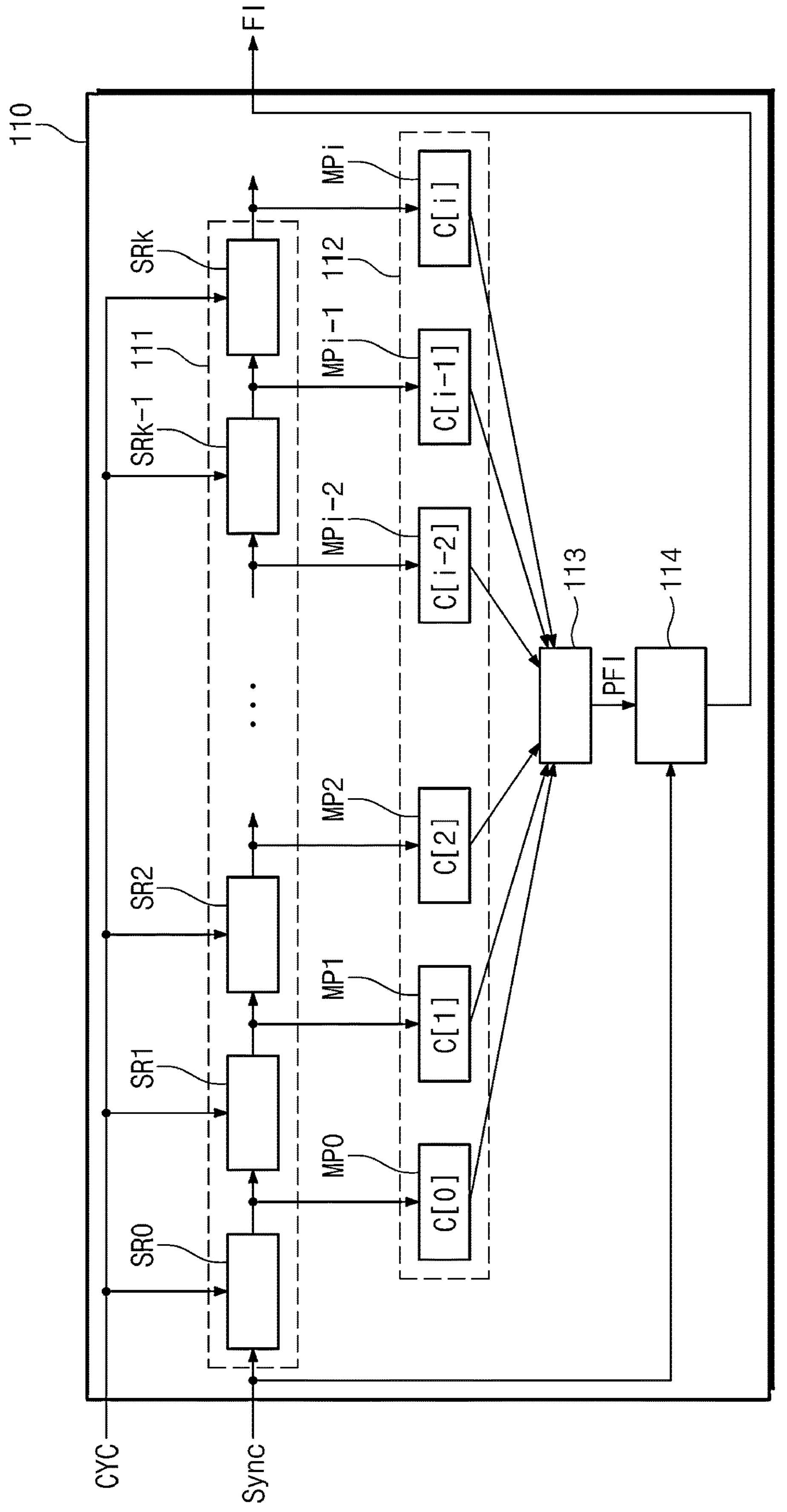
FIG. 8 is a block diagram illustrating a representative frequency calculator, according to an embodiment.

FIG. 8 is a block diagram illustrating a representative frequency calculator, according to an embodiment.

Referring to FIGS. 5 and 8, the control signal CTRL may include a synchronization signal Sync and a counting signal CYC. The synchronization signal Sync and the counting signal CYC may be provided to the representative frequency calculator 110. The representative frequency FI may be calculated based on the synchronization signal Sync and the counting signal CYC.

In an embodiment, the synchronization signal Sync may be enabled at a start point in time of each frame and may determine the start point in time of each frame. The synchronization signal Sync may include a vertical synchronization signal. The drive controller 100 (refer to FIG. 5) according to an embodiment may operate based on the scan signal GW (refer to FIG. 4A) as the synchronization signal Sync, instead of the vertical synchronization signal, but the invention is not limited thereto.

In an embodiment, the counting signal CYC may be provided at a given period in the one frame. The drive controller 100 (refer to FIG. 5) according to an embodiment may operate based on the emission signal EM (refer to FIG. 4A) instead of the counting signal CYC, but the invention is not limited thereto.

In an embodiment, the representative frequency calculator 110 may include a shift register unit 111, a weight multiplication unit 112, a frequency calculation unit 113, and a representative frequency output unit 114.

In an embodiment, the shift register unit 111 may receive the synchronization signal Sync and the counting signal CYC. The shift register unit 111 may include first to k-th shift registers SR0 to SRk, respectively. Herein, the "k" may be 128. However, this is an example, and the number of shift registers included in the shift register unit 111 is not limited thereto. For example, the "k" may be 16.

In an embodiment, the first to k-th shift registers SR0 to SRk, respectively, of the shift register unit 111 may be connected in series. For example, the first shift register SR0 may be connected to the second shift register SR1, and the second shift register SR1 may be connected to the third shift register SR2.

In an embodiment, when one shift register among the first to k-th shift registers SR0 to SRk, respectively, of the shift register unit 111 receives the counting signal CYC, the one shift register may output an output value to another shift register connected to the one shift register. For example, when the synchronization signal Sync whose value is "1" is provided to the first shift register SR0, a value of "1" may be stored in the first shift register SR0. Afterwards, when the counting signal CYC is provided to the first shift register SR0, the first shift register SR0 may provide an output value of "1" stored therein to the second shift register SR1.

In an embodiment, the weight multiplication unit 112 may be connected to the shift register unit 111. The weight multiplication unit 112 may include first to i-th weight multipliers MP0 to MPi, respectively. The number of weight multipliers included in the weight multiplication unit 112 may be equal to the number of shift registers included in the shift register unit 111.

In an embodiment, the first weight multiplier MP0 may multiply the output value of the first shift register SR0 and a first frequency weight coefficient C[0] together and may output a first calculation value.

In an embodiment, the second weight multiplier MP1 may multiply the output value of the second shift register SR1 and a second frequency weight coefficient C[1] together and may output a second calculation value.

In an embodiment, the third weight multiplier MP2 may multiply the output value of the third shift register SR2 and a third frequency weight coefficient C[2] together and may output a third calculation value.

In an embodiment, the weight multiplication unit 112 may provide the frequency calculation unit 113 with calculation values obtained by multiplying the output values of the shift register unit 111 and different weights in a one-to-one correspondence.

In an embodiment, the frequency calculation unit 113 may be connected to the weight multiplication unit 112. The frequency calculation unit 113 may add the calculation values to output an output frequency PFI.

In an embodiment, the representative frequency output unit 114 may be connected to the frequency calculation unit 113. The representative frequency output unit 114 may output the representative frequency FI based on the output frequency PFI and the synchronization signal Sync. The representative frequency output unit 114 may output, as the representative frequency FI, the output frequency PFI calculated immediately before a start of each frame.

Figure 10:
FIG. 10 is a bar graph illustrating frequency weight coefficients, according to an embodiment.

FIG. 9 illustrates an operation of a representative frequency calculator, according to an embodiment, and FIG. 10 is a graph illustrating frequency weight coefficients, according to an embodiment.

In an embodiment, an example in which the shift register unit 111 (refer to FIG. 8) includes first to sixteenth shift registers SR0 to SR15, respectively, is illustrated in FIGS. 9 and 10. First to fourteenth frames FP1 to FP14, respectively, are illustrated in FIG. 9 as an example.

In an embodiment and referring to FIGS. 8 to 10, the synchronization signal Sync may be a vertical synchronization signal Sync. The vertical synchronization signal Sync may be enabled at the start point in time of each of the frames FP1 to FP14 and may determine the start point in time of each of the frames FP1 to FP14. An enable period of the vertical synchronization signal Sync may vary depending on the frame rate.

In an embodiment, the counting signal CYC may be the emission signal EM (refer to FIG. 4A). The counting signal CYC may be provided to be repeated every given period.

In an embodiment and referring to FIG. 9, "W/H" may refer to an input of the synchronization signal Sync according to the counting signal CYC. "W" may mean that the synchronization signal Sync has a value of "1", and "H" may mean that the synchronization signal Sync has a value of "0". Values of "W/H" may be values input to the first shift register SR0.

In an embodiment, a counting number Cycle_cnt may indicate a value that is obtained by counting the number of times of iteration of the counting signal CYC in the one frame from "0". For example, the counting number Cycle_cnt may be 0 or 1 in the first frame FP1, and the counting number Cycle_cnt may be 0, 1, 2, or 3 in the tenth frame FP10. The counting number Cycle_cnt may be 0, 1, or 2 in the fourteenth frame FP14.

In an embodiment, a driving frequency DF may indicate a driving frequency of each of the first to fourteenth frames FP1 to FP14, respectively. For example, the driving frequency DF of each of the first frame FP1 to the eighth frame FP8 may be 240 Hz, the driving frequency DF of each of the ninth frame FP9 to the eleventh frame FP11 may be 120 Hz, and the driving frequency DF of each of the twelfth frame FP12 to the fourteenth frame FP14 may be 160 Hz. That is, the display panel DP may operate at a variable frequency.

In an embodiment, when the synchronization signal Sync and the counting signal CYC are input, the counting number Cycle_cnt may be "0", and a value of "1" may be input to the first shift register SR0. Afterwards, when the counting signal CYC is input without the input of the synchronization signal Sync, the counting number Cycle_cnt may be "1", and the first shift register SR0 may output an output value of "1" to the second shift register SR1. The value of "1" thus output may be input to the second shift register SR1. Because the synchronization signal Sync is not input to the first shift register SR0, a value of "0" may be input. The second shift register SR1 may output the stored value to the third shift register SR2.

In an embodiment, that is, when the counting signal CYC is input, the (n−1)-th shift register may output an (n−1)-th value to the n-th shift register. In this case, the n-th shift register may output an n-th value stored therein to the (n+1)-th shift register, and the (n−1)-th value may be stored in the n-th shift register. In an embodiment, "n" is a natural number greater than 2.

In an embodiment, the input of the synchronization signal Sync provided depending on the previous counting signal CYC may be stored in the first to sixteenth shift registers SR0 to SR15, respectively, as much as the number of shift registers included in the shift register unit 111. For example, an input value of the current synchronization signal Sync may be stored in the first shift register SR0. The input value of the synchronization signal Sync provided depending on the counting signal CYC before one cycle may be stored in the second shift register SR1. The input value of the synchronization signal Sync provided depending on the counting signal CYC before two cycles may be stored in the third shift register SR2.

In an embodiment, current and previous values of the synchronization signals Sync may be accumulated and stored in the shift register unit 111.

In an embodiment, the weight multiplication unit 112 may multiply the values stored in the shift register unit 111 and frequency weight coefficients MI in a one-to-one correspondence. As a number of a shift register whose value is multiplied by the frequency weight coefficient MI becomes greater, the frequency weight coefficient MI may become smaller.

In an embodiment, the frequency weight coefficients MI may include first to sixteenth frequency weight coefficients C[0] to C[15], respectively. The frequency weight coefficients MI may decrease as it goes from the first frequency weight coefficient C[0] toward the sixteenth frequency weight coefficient C[15]. For example, the first frequency weight coefficient C[0] may have a value of 100. The second frequency weight coefficient C[1] may have a value of 60. The third frequency weight coefficient C[2] may have a value of 36.

According to an embodiment, the driving frequency DF may have a great influence of an immediately previous driving frequency. The representative frequency calculator 110 may assign the first frequency weight coefficient C[0] with a relatively great value to the immediately previous driving frequency. The representative frequency calculator 110 may assign the sixteenth frequency weight coefficient C[15] with a relatively small value to a previous driving frequency over time. According to the above description, the display device DD (refer to FIG. 1) whose reliability is improved may be provided.

In an embodiment, when the counting number Cycle_cnt is 3 in the ninth frame FP9, "0" may be stored in the first shift register SR0. "0" may be stored in the second shift register SR1. "0" may be stored in the third shift register SR2. "1" may be stored in the fourth shift register SR3. "0" may be stored in the fifth shift register SR4. "1" may be stored in the sixth shift register SR5. "0" may be stored in the seventh shift register SR6. "1" may be stored in the eighth shift register SR7. "0" may be stored in the ninth shift register SR8. "1" may be stored in the tenth shift register SR9. "0" may be stored in the eleventh shift register SR10. "1" may be stored in the twelfth shift register SR11. "0" may be stored in the thirteenth shift register SR12. "1" may be stored in the fourteenth shift register SR13. “0” may be stored in the fifteenth shift register SR14. “1” may be stored in the sixteenth shift register SR15.

In an embodiment, the weight multiplication unit 112 may multiply the value stored in the first shift register SR0 and the first frequency weight coefficient C[0]. The weight multiplication unit 112 may multiply the value stored in the second shift register SR1 and the second frequency weight coefficient C[1]. The weight multiplication unit 112 may multiply the value stored in the third shift register SR2 and the third frequency weight coefficient C[2]. The weight multiplication unit 112 may multiply the value stored in the fourth shift register SR3 and the fourth frequency weight coefficient C[3]. The weight multiplication unit 112 may multiply the value stored in the fifth shift register SR4 and the fifth frequency weight coefficient C[4]. The weight multiplication unit 112 may multiply the value stored in the sixth shift register SR5 and the sixth frequency weight coefficient C[5]. The weight multiplication unit 112 may multiply the value stored in the seventh shift register SR6 and the seventh frequency weight coefficient C[6]. The weight multiplication unit 112 may multiply the value stored in the eighth shift register SR7 and the eighth frequency weight coefficient C[7]. The weight multiplication unit 112 may multiply the value stored in the ninth shift register SR8 and the ninth frequency weight coefficient C[8]. The weight multiplication unit 112 may multiply the value stored in the tenth shift register SR9 and the tenth frequency weight coefficient C[9]. The weight multiplication unit 112 may multiply the value stored in the eleventh shift register SR10 and the eleventh frequency weight coefficient C[10]. The weight multiplication unit 112 may multiply the value stored in the twelfth shift register SR11 and the twelfth frequency weight coefficient C[11]. The weight multiplication unit 112 may multiply the value stored in the thirteenth shift register SR12 and the thirteenth frequency weight coefficient C[12]. The weight multiplication unit 112 may multiply the value stored in the fourteenth shift register SR13 and the fourteenth frequency weight coefficient C[13]. The weight multiplication unit 112 may multiply the value stored in the fifteenth shift register SR14 and the fifteenth frequency weight coefficient C[14]. The weight multiplication unit 112 may multiply the value stored in the sixteenth shift register SR15 and the sixteenth frequency weight coefficient C[15].

In an embodiment, the frequency calculation unit 113 may calculate the output frequency PFI by adding calculation values obtained by multiplying the output values of the shift register unit 111 and different weights in a one-to-one correspondence. In this case, the output frequency PFI may have a value of 65.

In an embodiment, because the output frequency PFI is a frequency calculated immediately before the start of the tenth frame FP10, the value of 65 may be output as the representative frequency FI of the tenth frame FP10.

In an embodiment, the display device DD (refer to FIG. 2) may be driven by using a variable driving frequency. The change in the driving frequency may cause a luminance difference of a light that the display panel DP (refer to FIG. 2) emits. In an embodiment, the representative frequency calculator 110 may calculate the representative frequency FI by accumulating previous driving frequencies by using the shift register unit 111. The weight multiplication unit 112 may control the degree of consideration of accumulated driving frequencies by using a weight and may calculate the representative frequency FI. The drive controller 100 may output a signal for controlling the luminance of a light to be emitted by the display panel DP (refer to FIG. 2) by using the optimally calculated representative frequency FI. Accordingly, the display device DD (refer to FIG. 1) with improved display quality may be provided.

Figure 11:
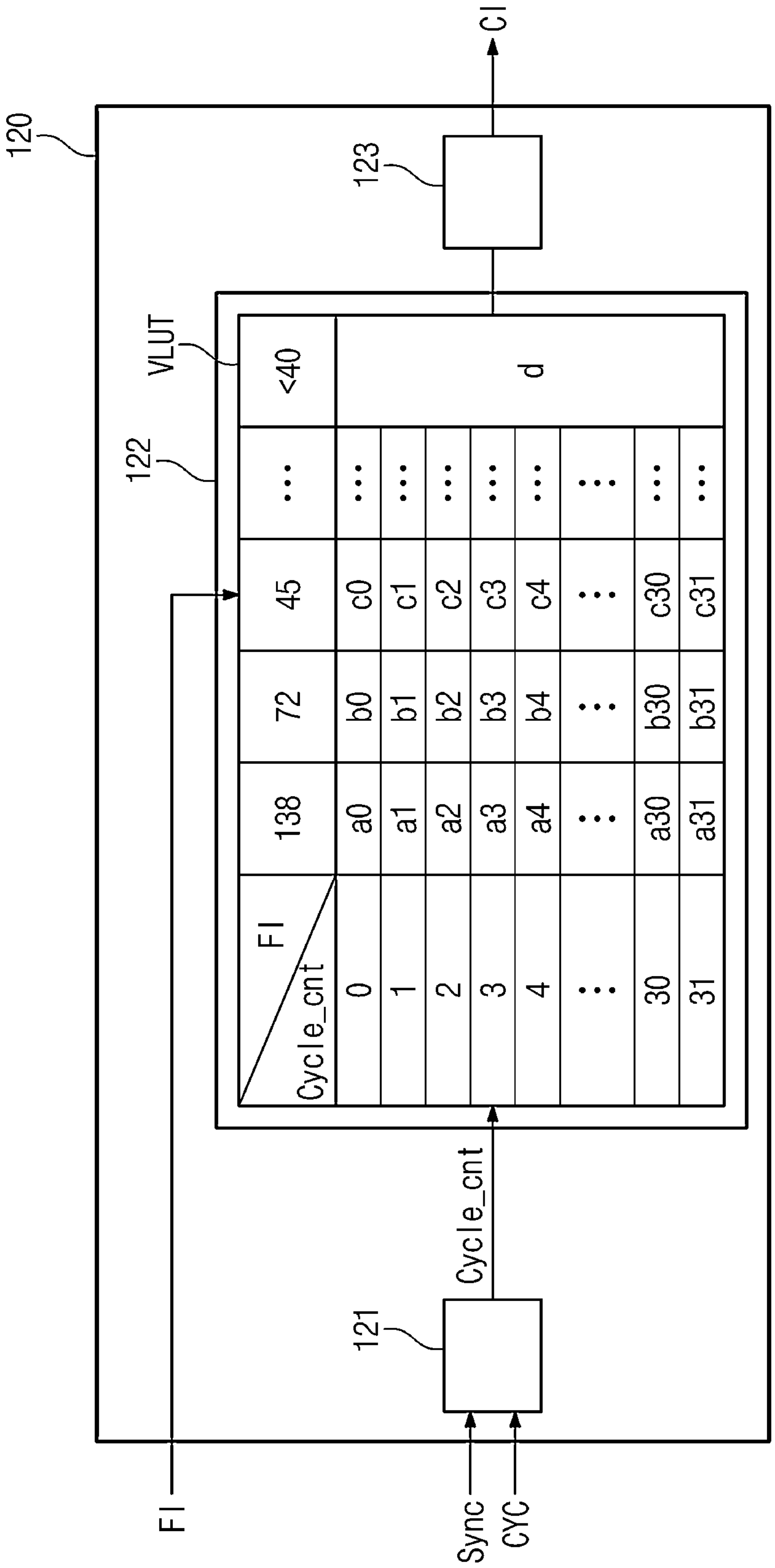
FIG. 11 is a block diagram illustrating a compensation signal calculator, according to an embodiment.

FIG. 11 is a block diagram illustrating a compensation signal calculator, according to an embodiment.

Referring to FIGS. 8 to 11, the compensation signal calculator 120 may receive the representative frequency FI, the synchronization signal Sync, and the counting signal CYC. Also, the compensation signal calculator 120 may further receive the voltage correction lookup table VLUT from the storage 140 (refer to FIG. 5).

In an embodiment, the compensation signal calculator 120 may include a counter 121, a first compensation value calculator 122, and a first interpolator 123.

In an embodiment, the counter 121 may receive the synchronization signal Sync and the counting signal CYC. The counter 121 may output the counting number Cycle_cnt based on the synchronization signal Sync and the counting signal CYC. The counting number Cycle_cnt may indicate a value that is obtained by counting the number of times of iteration of the counting signal CYC in one frame from “0”. The one frame may be defined based on the synchronization signal Sync. For example, the case where the synchronization signal Sync has a value of “1” may be defined as a start point in time of a frame.

In an embodiment, the first compensation value calculator 122 may receive the representative frequency FI and the counting number Cycle_cnt. The first compensation value calculator 122 may receive the voltage correction lookup table VLUT from the storage 140 (refer to FIG. 5).

In an embodiment, the voltage correction lookup table VLUT may include a plurality of correction values a0 to d. The compensation signal calculator 120 may output the compensation signal CI based on the plurality of correction values a0 to d.

In an embodiment, an example in which the counting number Cycle_cnt has values of 0 to 31 is illustrated in FIG. 11, but the invention is not limited thereto.

In an embodiment, when the representative frequency FI is greater than or equal to a reference value, the correction values a0 to c31 defined for respective counting numbers Cycle_cnt at the representative frequency FI may have at least two of the correction values a0 to c31 defined for respective counting numbers Cycle_cnt at the representative frequency FI may have different values. When the representative frequency FI output from the representative frequency calculator 110 has a value of 138, the first correction value a0 corresponding to the counting number Cycle_cnt of “0” and the second correction value a31 corresponding to the counting number Cycle_cnt of 31 may be different from each other. For example, when the compensation signal CI controls the reference voltage Vbias (refer to FIG. 2), the first correction value a0 may have a value that allows the compensation signal CI to control the reference voltage Vbias (refer to FIG. 2) to 6.00 V (volt), and the second correction value a31 may have a value that allows the compensation signal CI to control the reference voltage Vbias (refer to FIG. 2) to 7.30 V.

In an embodiment, the reference value may be 40. However, this is an example, and the given value may be variously provided by the user without limitation thereto.

In an embodiment, when the representative frequency FI is smaller than the reference value, at the representative frequency FI, the third correction value “d” may have a uniform value. For example, when the representative frequency FI output from the representative frequency calculator 110 is 36, the third correction value “d” may be fixed and may be output as the compensation signal CI. For example, when the compensation signal CI controls the reference voltage Vbias (refer to FIG. 2), the third correction value "d" may have a value that allows the compensation signal CI to control the reference voltage Vbias (refer to FIG. 2) to about 7.00 V.

In an embodiment, when the third correction value "d" is smaller than or equal to the first correction value a0, the counting number Cycle_cnt may increase in the display panel DP (refer to FIG. 2) that is driven at a low frequency, and thus, a light waveform may increase. This may cause the luminance deviation, that is, a flicker phenomenon may occur. For example, the low frequency may be about 30 Hz. However, in an embodiment, the reference voltage Vbias that is differently determined depending on the representative frequency FI and the counting number Cycle_cnt may be provided to the plurality of pixels PX (refer to FIG. 2). The third correction value "d" may be greater than the first correction value a0. The compensation signal output unit CO (refer to FIG. 5) may define the third correction value "d" such that there is provided the reference voltage Vbias (refer to FIG. 2) appropriate for the case where the display panel DP (refer to FIG. 2) is driven at the low frequency. The flicker that is capable of being caused when the plurality of pixels PX are driven at the low frequency may be made better. Accordingly, the display device DD (refer to FIG. 1) with improved display quality may be provided.

In an embodiment, assuming that the compensation is not made by the representative frequency calculator 110 and the compensation signal calculator 120, when the driving frequency DF changes from a high frequency to a low frequency, a phenomenon that luminance increases may occur in the light waveform of the display panel DP (refer to FIG. 2). When the driving frequency DF changes, the luminance deviation may occur in the light waveform. Also, the luminance deviation of the light waveform may differently occur depending on a cumulative driving frequency. For example, when the change from a frame of about 240 Hz to a frame of about 30 Hz is made once, the luminance deviation of about 4.3% may occur. When a frame changes to a frame of about 30 Hz after two frames of about 240 Hz, the luminance deviation of about 6.2% may occur. When a frame changes to a frame of about 30 Hz after four frames of about 240 Hz, the luminance deviation of about 8.0% may occur. When a frame changes to a frame of about 30 Hz after six frames of about 240 Hz, the luminance deviation of about 9.8% may occur. As such, the flicker phenomenon may occur. However, according to an embodiment, when the driving frequency DF changes, the representative frequency calculator 110 may calculate the representative frequency FI, and the compensation signal calculator 120 may output the compensation signal CI based on the representative frequency FI. The compensation may be made through the compensation signal CI such that the light waveform is uniform. That is, even though the luminance deviation occurs differently depending on the cumulative driving frequency, the luminance may be uniformly maintained by outputting the representative frequency FI based on the compensation signal CI. Accordingly, the display device DD (refer to FIG. 1) with improved display quality may be provided.

In an embodiment, the first interpolator 123 may calculate the compensation signal CI based on the correction values a0 to d received from the first compensation value calculator 122, by using an interpolation method. In an embodiment, the interpolation method may include a linear interpolation method. The linear interpolation method may be a method of calculating the compensation signal CI corresponding to the representative frequency FI, based on two coordinate values composed of the representative frequency FI and correction values (e.g., at least twos of a0 to d) under the condition of the same counting signal CYC, and the compensation signal CI thus calculated may be located between the two coordinate values. However, this is an example, and the first interpolator 123 according to an embodiment may selectively use various methods as the method of calculating the compensation signal CI.

In an embodiment, when the representative frequency FI output from the representative frequency calculator 110 has a value of 65 and the counting number Cycle_cnt is 2, the first compensation value calculator 122 may output correction values to the first interpolator 123 based on representative frequencies disposed adjacent to the representative frequency FI of 65 and the counting number Cycle_cnt. That is, the first compensation value calculator 122 may output the correction values b2 and b3 respectively located at the third row (Cycle_cnt=2) and second column (FI=72) of the voltage correction lookup table VLUT and the third row (Cycle_cnt=2) and third column (FI=45) of the voltage correction lookup table VLUT. The first interpolator 123 may output the compensation signal CI by performing linear interpolation with respect to the correction values b2 and c2.

According to an embodiment, the representative frequency calculator 110 may output the representative frequency FI in consideration of a plurality of cumulative driving frequencies. The compensation signal calculator 120 may output the compensation signal CI based on the representative frequency FI. The voltage correction lookup table VLUT may not be provided with respect to all cumulative driving frequencies, but one lookup table may be defined based on the calculated representative frequency FI. That is, because a lookup table including values corresponding to all cumulative frequencies of the display device DD (refer to FIG. 1) is not required, an additional memory may not be required. Accordingly, the area where the additional memory is disposed may not be required, and the area of the non-display area NDA (refer to FIG. 1) may decrease. Also, power consumption may be reduced by outputting the compensation signal CI by using the one lookup table 122 and the first interpolator 123. According to the above description, the display device DD (refer to FIG. 1) whose reliability is improved may be provided.

Figure 12:
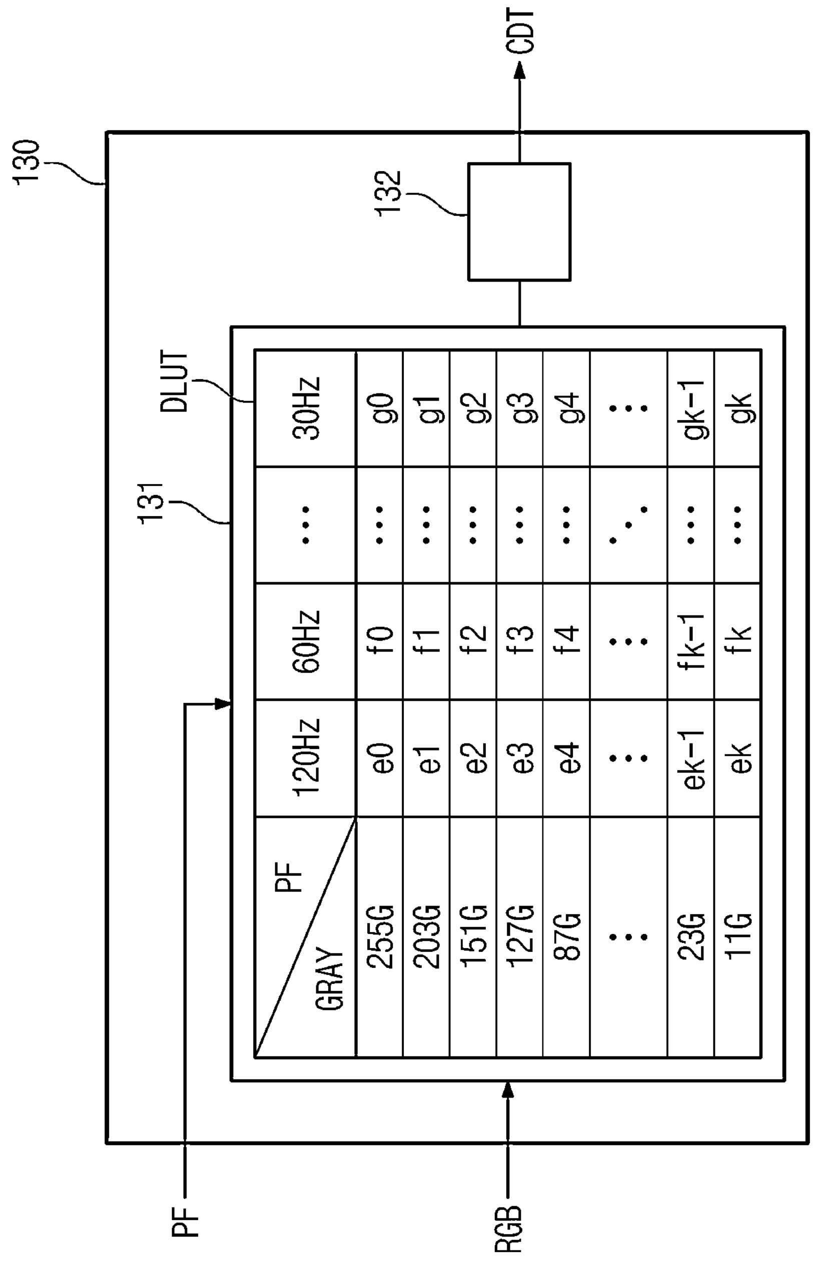
FIG. 12 is a block diagram illustrating a data compensation unit, according to an embodiment.

FIG. 12 is a block diagram illustrating a data compensation unit, according to an embodiment.

In an embodiment and referring to FIG. 12, the data compensation unit 130 may receive the image signal RGB and a previous driving frequency PF. The previous driving frequency PF may mean a driving frequency of a frame preceding one frame from among a plurality of frames. The data compensation unit 130 may output the compensation data signal CDT based on the image signal RGB in units of frame.

In an embodiment, the data compensation unit 130 may include a second correction value calculator 131 and a second interpolator 132.

In an embodiment, the second correction value calculator 131 may receive the previous driving frequency PF and the image signal RGB. The second correction value calculator 131 may receive the data correction lookup table DLUT from the storage 140 (refer to FIG. 5).

In an embodiment, the data correction lookup table DLUT may include a plurality of gray values e0 to gk depending on the previous driving frequencies PF and grays of the image signal RGB. In this case, "k" may be an integer of 6 or more. The second correction value calculator 131 may output the compensation data signal CDT based on the plurality of gray values e0 to gk. The compensation data signal CDT may correspond to a value obtained by adding the gray of the image signal RGB and a relevant gray value among the plurality of gray values e0 to gk.

In an embodiment, when the previous driving frequency PF has a first frequency and the gray of the image signal RGB has a first gray, the gray value may have the first gray value g0. In an embodiment, the compensation data signal CDT may be output based on the first gray value g0. For example, when the first frequency is about 30 Hz and the first gray is 255 G, the first gray value g0 may be about +14.

In an embodiment, when the previous driving frequency PF has a second frequency higher than the first frequency and the gray of the image signal RGB has the first gray, the gray value may have the second gray value e0 different from the first gray value g0. In this case, the compensation data signal CDT may be output based on the second gray value e0. The second gray voltage e0 may be smaller than the first gray value g0. For example, when the second frequency is about 120 Hz, the second gray value e0 may be about +7.

In an embodiment, when the previous driving frequency PF has the first frequency and the gray of the image signal RGB is a second gray lower than the first gray, the gray value may have the third gray value gk. In this case, the compensation data signal CDT may be output based on the third gray value gk. For example, when the second gray is 11 G, the third gray value gk may be about +3.

That is, in the data correction lookup table DLUT, as the frequency becomes relatively higher, each of the plurality of gray values e0 to gk becomes relatively smaller, as the frequency becomes relatively lower, each of the plurality of gray values e0 to gk becomes relatively greater, as the gray becomes higher, each of the plurality of gray values e0 to gk becomes greater, and, as the gray becomes smaller, each of the plurality of gray values e0 to gk becomes smaller. However, this is an example, and each of the plurality of gray values e0 to gk according to an embodiment may be variously provided without limitation thereto. For example, the gray values g0, g1, g2, g3, g4, gk−1, and gk corresponding to the previous driving frequency PF of about 30 Hz may respectively have values of about +14, about +12, about +11, about +7, about +6, about +2, and about +3.

In an embodiment, when the previous driving frequency PF is higher than about 120 Hz, the second correction value calculator 131 may output a gray value of “0”. The data compensation unit 130 may convert the image signal RGB into a data signal without compensation. That is, the compensation data signal CDT may have the same value as the data signal obtained by converting the image signal RGB. An example in which about 120 Hz is the highest frequency is illustrated in FIG. 12, but the data correction lookup table DLUT according to an embodiment may be variously provided without limitation thereto.

In an embodiment, a G-Value may between a high frequency and a low frequency be measured to evaluate the performance of the display device DD (refer to FIG. 1). In this case, the G-Value may be a value that is obtained by dividing a luminance value corresponding to the case of driving at about 240 Hz by a luminance value corresponding to the case of driving at about 30 Hz. This will be described later.

In an embodiment, assuming that compensation is not made by the data compensation unit 130, when the display device DD (refer to FIG. 1) operating in the variable frequency mode displays an image of a low gray, a great luminance difference may occur at different driving frequencies. Accordingly, when a driving frequency changes, a flicker may occur. However, according to an embodiment, there may be output the compensation data signal CDT that is obtained by correcting the gray of the image signal RGB through the data compensation unit 130. Through the compensation data signal CDT, the luminance of the display device DD (refer to FIG. 1) at the low frequency may be compensated for. The G-Value of the display device DD (refer to FIG. 1) may be improved. Accordingly, the display device DD (refer to FIG. 1) with improved display quality may be provided.

In an embodiment, the second interpolator 132 may calculate the compensation data signal CDT based on the gray values e0 to gk received from the second correction value calculator 131, by using an interpolation method. For example, the interpolation method may include a linear interpolation method. That is, when the gray of the image signal RGB is a gray not stored in the data correction lookup table DLUT, a gray value may be calculated by using the interpolation method.

Figure 13:
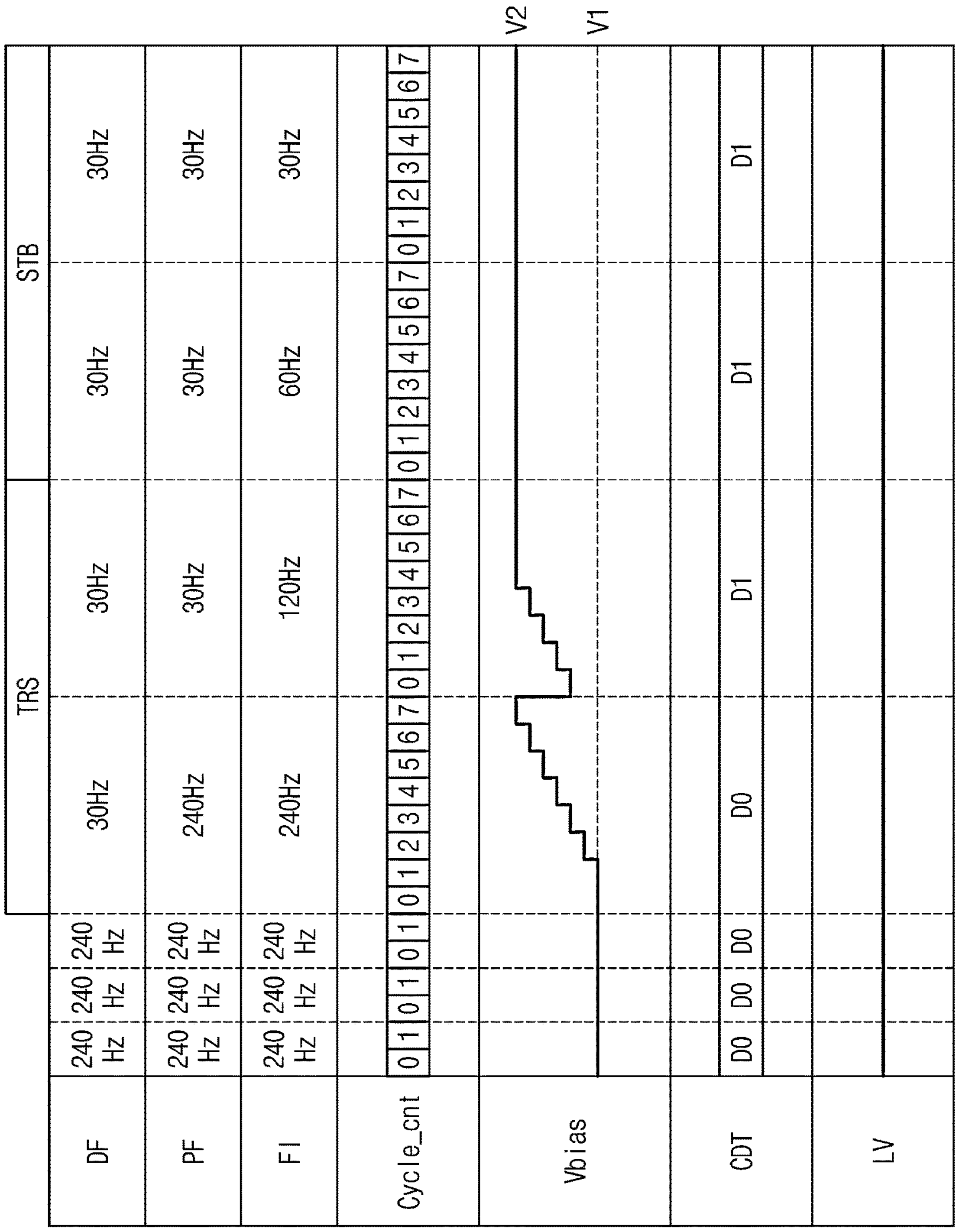
FIG. 13 is a block diagram which illustrates the process of driving a display device, according to an embodiment.

FIG. 13 illustrates the process of driving a display device, according to an embodiment.

In an embodiment and referring to FIGS. 2, 5, 12, and 13, in the variable frequency mode, the driving frequency DF may be converted. The driving frequency DF may be converted from a first frequency to a second frequency. For example, the first frequency may be about 240 Hz, and the second frequency may be about 30 Hz.

After the driving frequency DF is converted from the first frequency to the second frequency, given frames may be referred to as a “conversion time period TRS”.

In an embodiment, the display device DD may operate in a stable time period STB after the conversion time period TRS. In the stable time period STB, the driving frequency DF may be the second frequency.

In an embodiment, the drive controller 100 may include the compensation signal output unit CO and the data compensation unit 130. The compensation signal output unit CO may include the representative frequency calculator 110 and the compensation signal calculator 120.

In an embodiment, the representative frequency calculator 110 may output the representative frequency FI based on “a” driving frequencies DF of frames preceding one frame from among a plurality of frames.

In an embodiment, the compensation signal calculator 120 may output the compensation signal CI based on the representative frequency FI and the counting number Cycle_cnt in one frame.

In an embodiment, the compensation signal output unit CO may output the compensation signal CI in units of counting number Cycle_cnt.

In an embodiment, the voltage generator 300 may generate the reference voltage Vbias to be provided to the first electrode of the first transistor T1 (refer to FIG. 3). The voltage generator 300 may control the level of the reference voltage Vbias based on the compensation signal CI.

In an embodiment, as the counting number Cycle_cnt increases, the voltage level of the reference voltage Vbias may increase.

In an embodiment, as the driving frequency DF increases, the maximum value of the voltage level of the reference voltage Vbias may decrease. For example, when the driving frequency DF has the first frequency, the reference voltage Vbias may have a first voltage level V1. For example, the first voltage V1 may be about 6 V. When the driving frequency DF has the second frequency lower than the first frequency, the reference voltage Vbias may have a second voltage level V2 higher than the first voltage level V1. For example, the second voltage level V2 may be about 7 V.

In an embodiment, as the representative frequency FI increases, the average value of the voltage level of the reference voltage Vbias may decrease. The luminance of the plurality of pixels PX of the display panel DP may be controlled by the reference voltage Vbias.

In an embodiment, the data compensation unit 130 may output the compensation data signal CDT obtained by adding the gray of the image signal RGB and a gray value based on the data correction lookup table DLUT in which the gray value is stored.

In an embodiment, assuming that the gray of the image signal RGB is about 87 G, when the previous driving frequency PF is about 240 Hz, the compensation data signal CDT may be output without compensation. The compensation data signal CDT may include a first data signal DO. For example, the first data signal DO may be a data signal converted based on the image signal RGB. When the previous driving frequency PF has the second frequency lower than the first frequency, the second correction value calculator 131 may output the gray value g4. The second frequency may be about 30 Hz. The compensation data signal CDT may be output based on the gray value g4. The compensation data signal CDT may include a second data signal D1. For example, the second data signal D1 may have a value obtained by adding the gray value g4 and the data signal converted based on the image signal RGB. The first data signal DO may be different from the second data signal D1.

In an embodiment, the data compensation unit 130 may output the compensation data signal CDT in units of frame.

In an embodiment, the luminance of the plurality of pixels PX of the display panel DP may be controlled by the compensation data signal CDT.

According to an embodiment, the representative frequency calculator 110 may output the representative frequency FI in consideration of cumulative driving frequencies. The compensation signal calculator 120 may output the optimal compensation signal CI based on the representative frequency FI. Each of the plurality of pixels PX of the display panel DP may emit a light based on the reference voltage Vbias controlled by the compensation signal CI. The data compensation unit 130 may output the optimal compensation data signal CDT in consideration of the gray of the image signal RGB and the previous driving frequency PF. Each of the plurality of pixels PX of the display panel DP may emit a light based on the data voltage Vdata controlled by the compensation data signal CDT. That is, the luminance of the image IM (refer to FIG. 1) may be controlled based on the compensation signal CI and the compensation data signal CDT. The display device DD may provide a uniform light waveform LV regardless of the change in the driving frequency DF. Accordingly, the display device DD whose display quality is improved may be provided.

According to another embodiment, like the drive controller 100-1 of FIG. 7, assuming that the data compensation unit 130-1 outputs a gray value based on not the previous driving frequency PF but the representative frequency FI, when the gray of the image signal RGB is about 87 G and the representative frequency FI is about 120 Hz, the second correction value calculator 131 may output the gray value of e4. The compensation data signal CDT-1 may be output based on the gray value of e4. Afterwards, when the representative frequency FI is about 60 Hz, the second correction value calculator 131 may output the gray value of f4. The compensation data signal CDT-1 may be output based on the gray value of f4. Afterwards, when the representative frequency FI is about 30 Hz, the second correction value calculator 131 may output the gray value of g4. The compensation data signal CDT-1 may be output based on the gray value of g4.

Figure 14A:
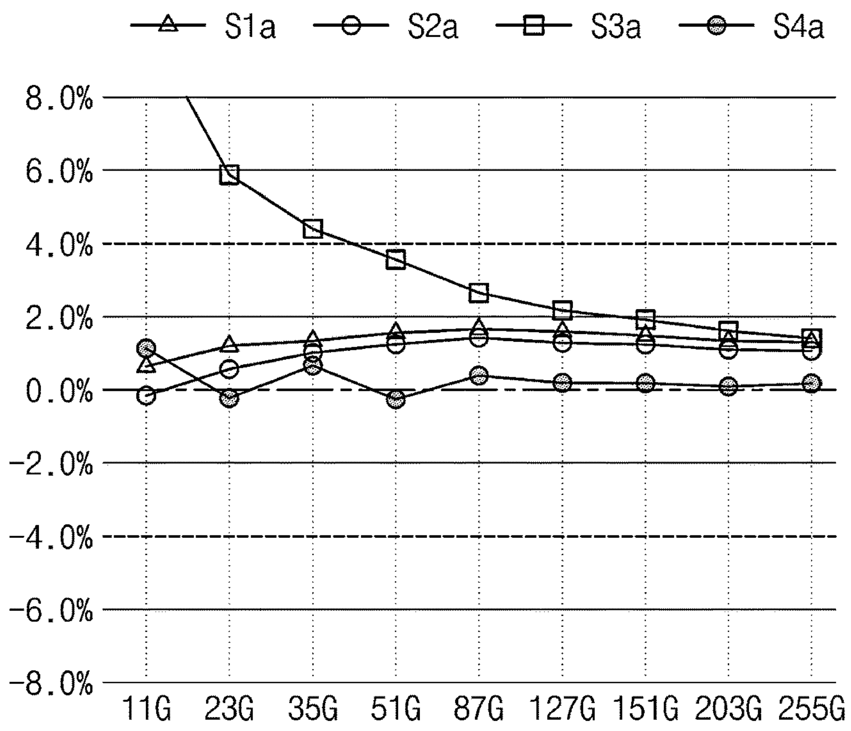
FIG. 14A is a graph illustrating a G-Value for each gray, according to an embodiment.

FIG. 14A is a graph illustrating a G-Value for each gray, according to an embodiment.

In FIG. 14A, a horizontal axis represents a gray of the image signal RGB (refer to FIG. 2), and a vertical axis represents a G-value.

The G-Value may be defined by Equation 1 below.

$$G\text{-Value} = (LUM(HIGHFREQ) - LUM(LOWFREQ))/LUM(HIGHFREQ) \quad \text{[Equation 1]}$$

Referring to Equation 1 above, LUM(HIGHFREQ) represents the luminance of the display panel DP (refer to FIG. 2) that is driven at the first frequency among variable driving frequencies, and LUM(LOWFREQ) represents the luminance of the display panel DP (refer to FIG. 2) that is driven at the second frequency lower than the first frequency from among the variable driving frequencies. The units of the G-Value may be %. In FIG. 14A, the first frequency may correspond to about 240 Hz, and the second frequency may correspond to about 30 Hz.

In an embodiment and referring to FIGS. 2, 5, and 14A, first to third graphs S1a, S2a, and S3a may be graphs illustrating G-Values of a display panel according to a comparative example.

In an embodiment, the first graph S1a may show a G-Value for each gray of a display device that is driven by using a drive controller not including the compensation signal output unit CO and the data compensation unit 130.

In an embodiment, the second graph S2a may show a G-Value for each gray of a display device that is driven by using a drive controller not including the data compensation unit 130 and controls the reference voltage Vbias to have the same voltage level as the high frequency at the low frequency.

In an embodiment, the third graph S3a may show a G-Value for each gray of a display device that is driven by using a drive controller not including the data compensation unit 130.

In an embodiment, a fourth graph S4a may be a graph illustrating a G-Value for each gray of the display device DD to which the drive controller 100 is applied.

In an embodiment, as the display quality of the display device DD becomes better, the G-Value may be close to about 0.0%. For example, when the G-Value is between about −4.0% and about 4.0%, the display device DD may be determined as good.

In an embodiment, when the gray of the image signal RGB is about 11 G, the G-Value of the first graph S1a may be about 0.6%, the G-Value of the second graph S2a may be about −0.2%, the G-Value of the third graph S3a may be about 10.1%, and the G-Value of the fourth graph S4a may be about 1.0%.

In an embodiment, the display device DD including the drive controller 100 may make the G-Value better. Accordingly, the display device DD whose display quality is improved may be provided.

In an embodiment, an F-Value between the high frequency and the low frequency may be measured to evaluate the performance of the display device DD (refer to FIG. 1). The F-Value may be defined by Equation 2 below.

$$F\text{-Value} = (LUM(HIGHFREQ, 255G) - LUM(LOWFREQ, 255G))/(HIGHFREQ - LOWFREQ) \quad \text{[Equation 2]}$$

Referring to Equation 2 above, LUM(HIGHFREQ,255 G) represents the luminance corresponding to the gray of 255 G when the display panel DP (refer to FIG. 2) is driven at the first frequency among variable driving frequencies, LUM (LOWFREQ,255 G) represents the luminance corresponding to the gray of 255 G when the display panel DP (refer to FIG. 2) is driven at the second frequency lower than the first frequency from among the variable driving frequencies and (HIGHFREQ−LOWFREQ) may mean a value obtained by subtracting the second frequency from the first frequency. The first frequency may correspond to about 240 Hz, and the second frequency may correspond to about 30 Hz.

In an embodiment, the F-Value measured from a display device that does not include the data compensation unit 130 and controls the reference voltage Vbias to have the same voltage level as the high frequency at the low frequency may be about 0.019. A luminance difference corresponding to the F-Value of about 0.019 may be about 4.0 nit.

In an embodiment, the F-Value measured from the display device DD including the drive controller 100 may be about 0.002. A luminance difference corresponding to the F-Value of about 0.002 may be about 0.4 nit.

According to an embodiment, the F-Value of the display panel DP may be about 0.002. The F-Value may be improved compared to the comparative example in which the data compensation unit 130 is not included and the reference voltage Vbias is controlled to have the same voltage level as the high frequency at the low frequency. Accordingly, the display device DD whose display quality is improved may be provided.

Figure 14B:
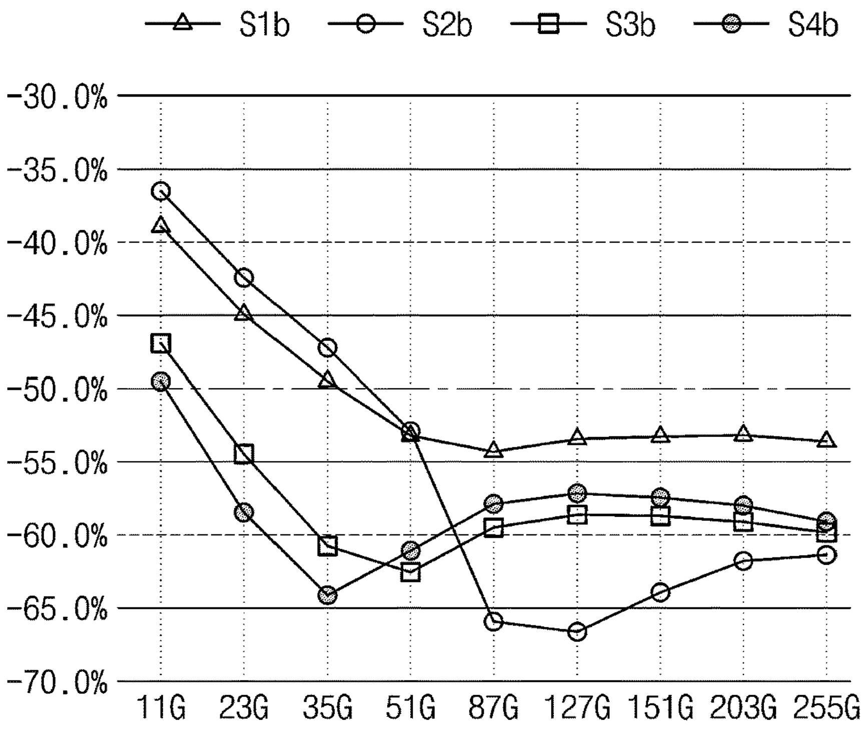
FIG. 14B is a graph illustrating a JEITA value measured for each gray in a low-frequency time period, according to an embodiment.

FIG. 14B is a graph illustrating a JEITA value measured for each gray in a low-frequency time period, according to an embodiment.

In FIG. 14B, a horizontal axis represents a gray of the image signal RGB (refer to FIG. 2), and a vertical axis represents a JEITA value measured in a low-frequency time period. For example, the low-frequency time period may be defined as the stable time period STB (refer to FIG. 13). The JEITA method flicker measurement method may be used to evaluate a flicker level of the display device DD (refer to FIG. 1) quantitatively. The JEITA method Flicker may be a method of quantitatively measuring a flicker that the Japan Electronics and Information Technology Industries Association defines. The JEITA value may be a value measured in units of dB (decibel) by using the JEITA Method Flicker.

Referring to FIGS. 2, 5, and 14B, first to third graphs S1*b*, S2*b*, and S3*b* may be graphs illustrating JEITA values of a display panel according to the comparative example of the present disclosure.

The first graph S1*b* may show a JEITA value for each gray of a display device that is driven by using a drive controller not including the compensation signal output unit CO and the data compensation unit 130 of the present disclosure.

The second graph S2*b* may show a JEITA value for each gray of a display device that is driven by using a drive controller not including the data compensation unit 130 of the present disclosure and controls the reference voltage Vbias to have the same voltage level as the high frequency at the low frequency.

In the second graph S2*b*, a range of a gray corresponding to the JEITA value of −55.0 dB or less may be from 255 G to 87 G.

The third graph S3*b* may show a JEITA value for each gray of a display device that is driven by using a drive controller not including the data compensation unit 130 of the present disclosure.

A fourth graph S4*b* may be a graph illustrating a JEITA value for each gray of the display device DD to which the drive controller 100 of the present disclosure is applied.

As the display quality of the display device DD becomes better, the JEITA value may become smaller. For example, when the JEITA value is smaller than −45.0 dB, the display device DD may be determined as good.

For example, when the gray of the image signal RGB is 11 G, the JEITA value of the first graph S1*b* may be −38.9 dB, the JEITA value of the second graph S2*b* may be −36.5 dB, the JEITA value of the third graph S3*b* may be −47.0 dB, and the JEITA value of the fourth graph S4*b* may be −49.5 dB.

The display device DD including the drive controller 100 of the present disclosure may make the flicker in the low-frequency time period better. Accordingly, the display device DD whose display quality is improved may be provided.

In the fourth graph S4*b*, a range of a gray corresponding to the JEITA value of −55 dB or less may be from 255 G to 23 G.

According to the present disclosure, a range of a gray corresponding to the JEITA value of −55 dB or less may be wider compared to the comparative example in which the data compensation unit 130 is not included and the reference voltage Vbias is controlled to have the same voltage level as the high frequency at the low frequency. The display device DD including the drive controller 100 of the present disclosure may make the flicker in the low-frequency time period better. Accordingly, the display device DD whose display quality is improved may be provided.

Figure 14C:
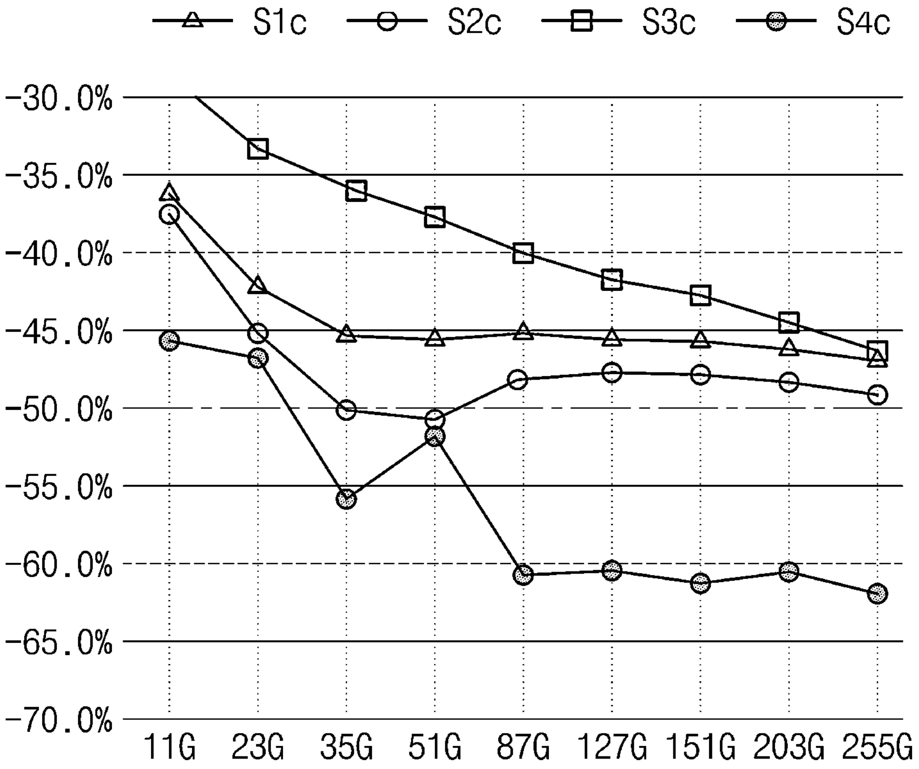
FIG. 14C is a graph illustrating a JEITA value for each gray measured when a frequency changes from a high frequency to a low frequency, according to an embodiment.

FIG. 14C is a graph illustrating a JEITA value for each gray measured when a frequency is converted from a high frequency to a low frequency, according to an embodiment of the present disclosure.

In FIG. 14C, a horizontal axis represents a gray of the image signal RGB (refer to FIG. 2), and a vertical axis represents a JEITA value measured when a frequency is converted from the high frequency to the low frequency. For example, a time period in which a frequency is converted from the high frequency to the low frequency may be defined as the conversion time period TRS (refer to FIG. 13).

Referring to FIGS. 2, 5, and 14C, first to third graphs S1*c*, S2*c*, and S3*c* may be graphs illustrating JEITA values measured from a display panel according to the comparative example of the present disclosure.

The first graph S1*c* may show a JEITA value for each gray of a display device that is driven by using a drive controller not including the compensation signal output unit CO and the data compensation unit 130 of the present disclosure.

The second graph S2*c* may show a JEITA value for each gray of a display device that is driven by using a drive controller not including the data compensation unit 130 of the present disclosure and controls the reference voltage Vbias to have the same voltage level as the high frequency at the low frequency.

In the second graph S2*c*, an average of JEITA values in a gray range from 87 G to 255 G may be −48.5 dB.

The third graph S3*c* may show a JEITA value for each gray of a display device that is driven by using a drive controller not including the data compensation unit 130 of the present disclosure.

A fourth graph S4*c* may be a graph illustrating a JEITA value for each gray of the display device DD to which the drive controller 100 of the present disclosure is applied.

For example, when the gray of the image signal RGB is 11 G, the JEITA value of the first graph S1*c* may be −36.5 dB, the JEITA value of the second graph S2*c* may be −37.8 dB, the JEITA value of the third graph S3*c* may be −28.9 dB, and the JEITA value of the fourth graph S4*c* may be −46.0 dB.

The display device DD including the drive controller 100 of the present disclosure may make the flicker in the low-frequency time period better. Accordingly, the display device DD whose display quality is improved may be provided.

In the fourth graph S4*c*, an average of JEITA values in a gray range from about 87 G to about 255 G may be about −60.7 dB.

According to an embodiment, the average of the JEITA values in the gray range from about 87 G to about 255 G may be smaller compared to the comparative example in which the data compensation unit 130 is not included and the reference voltage Vbias is controlled to have the same voltage level as the high frequency at the low frequency. As the display quality of the display device DD becomes better, the JEITA value may become smaller. The display device DD including the drive controller 100 may make the flicker in the low-frequency time period better. Accordingly, the display device DD whose display quality is improved may be provided.

According to an embodiment, the drive controller 100 may include the representative frequency calculator 110, the compensation signal calculator 120, and the data compensation unit 130. In the display device DD including the drive controller 100, all of the G-Value, the JEITA value measured in the low-frequency time period, and the JEITA value measured when a frequency is converted from the high frequency to the low frequency may be improved. Accordingly, the display device DD whose display quality is improved may be provided.

Figure 15:
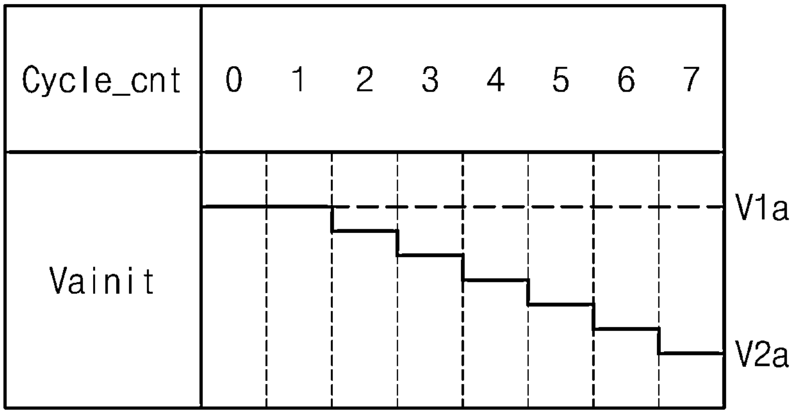
FIG. 15 is a timing diagram which illustrates how a second initialization voltage is driven, according to an embodiment.

FIG. 15 is a graph which illustrates how a second initialization voltage is driven, according to an embodiment. FIG. 15 shows a level of the second initialization voltage Vainit (refer to FIG. 2) in a frame of FIG. 13 when a frequency changes from about 240 Hz to about 30 Hz.

In an embodiment and referring to FIGS. 2, 3, 5, and 15, the voltage generator 300 may generate the second initialization voltage Vainit to be provided to the second electrode of the fourth transistor T4. The voltage generator 300 may control the level of the second initialization voltage Vainit based on the compensation signal CI. The compensation signal CI may be used to control the second initialization voltage Vainit instead of the reference voltage Vbias unlike FIG. 13.

In an embodiment, when the representative frequency FI has a value of about 40 or more, the level of the second initialization voltage Vainit may decrease as the counting number Cycle_cnt increases. For example, in the case of a frame whose frequency changes from about 240 Hz to about 30 Hz, the second initialization voltage Vainit corresponding to the counting number Cycle_cnt of "0" may have a first level V1*a*, and the second initialization voltage Vainit corresponding to the counting number Cycle_cnt of "7" may have a second level V2*a*. The luminance of the plurality of pixels PX of the display panel DP may be controlled by the second initialization voltage Vainit.

According to an embodiment, the representative frequency calculator 110 may output the representative frequency FI in consideration of cumulative driving frequencies. The compensation signal calculator 120 may output the optimal compensation signal CI based on the representative frequency FI. Each of the plurality of pixels PX of the display panel DP may emit a light based on the second initialization voltage Vainit controlled by the compensation signal CI. The display device DD may provide a uniform light waveform regardless of the change in the driving frequency DF. Accordingly, the display device DD whose display quality is improved may be implemented.

Figure 16:
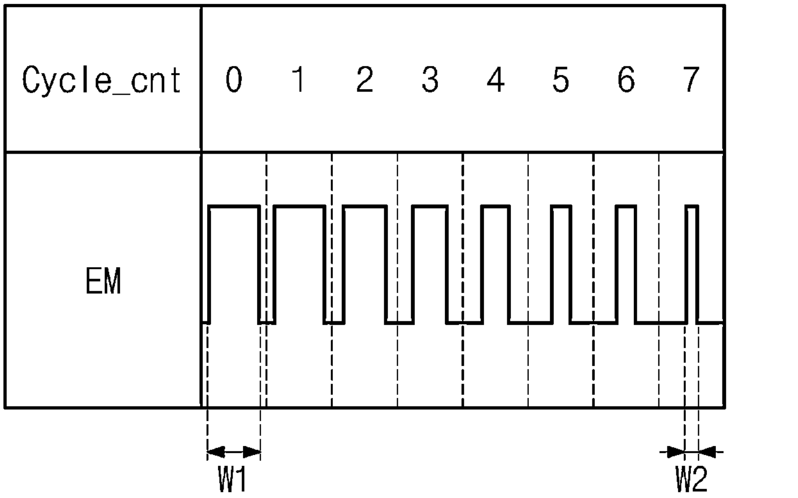
FIG. 16 is a timing diagram which illustrates how an emission signal is driven, according to an embodiment.

FIG. 16 illustrates how an emission signal is driven, according to an embodiment. FIG. 16 shows a level of the emission signal EM (refer to FIG. 4A) in a frame of FIG. 13 when a frequency changes from about 240 Hz to about 30 Hz.

In an embodiment and referring to FIGS. 2, 3, 5, and 16, the emission driving circuit EDC may receive the compensation signal CI. Unlike FIGS. 2 and 13 in which the compensation signal CI is provided to the voltage generator 300 to control the reference voltage Vbias, the compensation signal CI according to an embodiment may be provided to the emission driving circuit EDC to control the emission signals EM1 and EM2.

In an embodiment, the emission driving circuit EDC may receive the emission driving control signal ECS and the compensation signal CI from the drive controller 100.

In an embodiment, an emission signal correction lookup table may be stored in the storage 140, and the first compensation value calculator 122 (refer to FIG. 11) may receive the emission signal correction lookup table from the storage 140.

In an embodiment, the emission driving circuit EDC may generate the emission signal EM. The emission driving circuit EDC may control a pulse width of the emission signal EM to be provided to the gate electrode of the ninth transistor T9, based on the compensation signal CI. However, this is an example, and the emission signal EM according to an embodiment may refer to at least one of the first emission signal EM1 and the second emission signal EM2. The pulse width may refer to a time period in which the emission signal EM is applied.

In an embodiment, when the representative frequency FI has a value of about 40 or more, the pulse width of the emission signal EM may decrease as the counting number Cycle_cnt increases. For example, in the case of a frame whose frequency changes from about 240 Hz to about 60 Hz, the emission signal EM corresponding to the counting number Cycle_cnt of "0" may have a first pulse width W1, and the emission signal EM corresponding to the counting number Cycle_cnt of "7" may have a second pulse width W2. When the representative frequency FI is about 100, the first pulse width W1 may be greater than the second pulse width W2. The luminance of the plurality of pixels PX of the display panel DP may be controlled of the pulse width of the emission signal EM.

According to an embodiment, the representative frequency calculator 110 may output the representative frequency FI in consideration of cumulative driving frequencies. The compensation signal calculator 120 may output the optimal compensation signal CI based on the representative frequency FI. Each of the plurality of pixels PX of the display panel DP may emit a light based on the emission signal EM controlled by the compensation signal CI. The display device DD may provide a uniform light waveform regardless of the change in the driving frequency DF. Accordingly, the display device DD whose display quality is improved may be implemented.

In an embodiment and according to the above description, a drive controller may include a representative frequency calculator, a compensation signal calculator, and a data compensation unit. The representative frequency calculator may output a representative frequency in consideration of cumulative driving frequencies. The compensation signal calculator may output an optimal compensation signal based on the representative frequency. Each of a plurality of pixels of a display panel may emit a light based on a reference voltage controlled by the compensation signal. The data compensation unit may output an optimal compensation data signal in consideration of a gray of an image signal and a previous driving frequency. Each of the plurality of pixels of the display panel may emit a light based on a data voltage controlled by the compensation data signal. That is, the luminance of an image may be controlled based on the compensation signal and the compensation data signal. A display device may provide a uniform light waveform regardless of a change in a driving frequency. Accordingly, a display device with improved display quality may be provided.

In an embodiment, also, in the display device including the drive controller, all of a G-Value, a JEITA value measured in a low-frequency time period, and a JEITA value when a frequency is converted from a high frequency to a low frequency may be improved. Accordingly, a display device with improved display quality may be provided.

While the invention has been described with reference to embodiments thereof, it will be apparent to those of ordinary skill in the art that various changes and modifications may be made thereto without departing from the spirit and scope of the invention. Moreover, the embodiments or parts of the embodiments may be combined in whole or in part without departing from the scope of the invention.

What is claimed is:

1. A display device comprising:

a display panel including a plurality of pixels, wherein the display panel is configured to display an image corresponding to each of a plurality of frames; and a drive controller configured to receive an image signal and to drive the plurality of frames at a plurality of driving frequencies, wherein the drive controller includes:

a representative frequency calculator configured to output a representative frequency based on "n" driving frequencies of frames preceding one frame from among the plurality of frames;

a compensation signal calculator configured to output a compensation signal based on the representative frequency and a counting number in the one frame; and a data compensation unit configured to receive the image signal and to output a compensation data signal by adding a gray of the image signal and a gray value based on a data correction lookup table in which the gray value is stored, wherein luminance of the image is controlled based on the compensation signal and the compensation data signal.

2. The display device of claim 1, wherein a gray value according to the representative frequency and the gray of the image signal is stored in the data correction lookup table.

3. The display device of claim 1, wherein a gray value according to the gray of the image signal and a previous driving frequency of a frame preceding the one frame from among the plurality of frames is stored in the data correction lookup table.

4. The display device of claim 3, wherein, when the previous driving frequency has a first frequency, the gray value has a first gray value, and the compensation data signal is output based on the first gray value, wherein, when the previous driving frequency has a second frequency higher than the first frequency, the gray value has a second gray value, and the compensation data signal is output based on the second gray value, and wherein the second gray value is smaller than the first gray value.

5. The display device of claim 1, wherein the data correction lookup table includes a plurality of data correction lookup tables, and wherein the plurality of data correction lookup tables are provided depending on a luminance value of the image signal.

6. The display device of claim 1, wherein, when the gray of the image signal is a gray not stored in the data correction lookup table, the data compensation unit calculates the gray value by using an interpolation method.

7. The display device of claim 1, wherein the representative frequency is calculated based on a synchronization signal defining a start of each of the plurality of frames and a counting signal obtained by counting the plurality of frames at a given period, and wherein the counting number is output based on the counting signal.

8. The display device of claim 7, wherein the representative frequency calculator includes a plurality of shift registers receiving the synchronization signal and the counting signal, wherein the plurality of shift registers are electrically connected in series, and wherein, when one shift register among the plurality of shift registers receives the counting signal, the one shift register transmits an output value to another shift register connected to the one shift register.

9. The display device of claim 8, wherein the representative frequency is calculated by multiplying output values of the plurality of shift registers and different weights in a one-to-one correspondence.

10. The display device of claim 1, further comprising:

a voltage generator configured to receive the compensation signal, to generate a voltage whose voltage level is adjusted based on the compensation signal, and to provide the voltage to each of the plurality of pixels.

11. The display device of claim 10, wherein, as the counting number increases, the voltage level of the voltage increases.

12. The display device of claim 10, wherein, when the driving frequency has a first frequency, the voltage has a first voltage level, and wherein, when the driving frequency has a second frequency lower than the first frequency, the voltage has a second voltage level higher than the first voltage level.

13. The display device of claim 1, further comprising:

a driving circuit configured to receive the compensation signal, to generate an emission signal whose pulse width is adjusted depending on the compensation signal, and to provide the emission signal to each of the plurality of pixels.

14. The display device of claim 13, wherein, as the counting number increases, a width of the pulse width becomes narrower.

15. The display device of claim 1, wherein the drive controller further includes:

storage configured to store the data correction lookup table.

16. A drive controller comprising:

a representative frequency calculator, a compensation signal calculator, and a data compensation unit, wherein the drive controller receives an image signal corresponding to each of a plurality of frames, each of which is driven at a driving frequency, wherein the representative frequency calculator outputs a representative frequency based on "n" driving frequencies of frames preceding one frame from among the plurality of frames, wherein the compensation signal calculator outputs a compensation signal based on the representative frequency and a counting number in the one frame, and wherein, based on a data correction lookup table in which a gray value according to a gray of the image signal is stored, the data compensation unit adds the gray of the image signal and a gray value to output a compensation data signal.

17. The drive controller of claim 16, wherein a gray value according to the representative frequency and the gray of the image signal is stored in the data correction lookup table.

18. The drive controller of claim 16, wherein the gray value according to the gray of the image signal and a previous driving frequency of a frame preceding the one frame is stored in the data correction lookup table.

19. The drive controller of claim 18, wherein, when the previous driving frequency has a first frequency, the gray value has a first gray value, and the compensation data signal is output based on the first gray value, wherein, when the previous driving frequency has a second frequency higher than the first frequency, the gray value has a second gray value, and the compensation data signal is output based on the second gray value, and wherein the second gray value is smaller than the first gray value.

20. The drive controller of claim 18, further comprising:

storage configured to store the data correction lookup table.

21. A driving method of a display device which displays an image based on an image signal corresponding to each of a plurality of frames, the method comprising:

outputting a representative frequency based on "n" driving frequencies of frames preceding one frame from among the plurality of frames;

outputting a compensation signal based on the representative frequency and a counting number in the one frame;

outputting a compensation data signal obtained by adding a gray of the image signal and a gray value according to the gray of the image signal, based on a data correction lookup table in which the gray value according to the gray of the image signal is stored, wherein luminance of the image is controlled based on the compensation signal and the compensation data signal.

22. The method of claim 21, wherein a gray value according to the representative frequency and the gray of the image signal is stored in the data correction lookup table.

23. The method of claim 21, wherein the gray value according to the gray of the image signal and a previous driving frequency of a frame preceding the one frame from among the plurality of frames is stored in the data correction lookup table.

24. The method of claim 21, wherein the outputting of the compensation data signal includes:

when the previous driving frequency has a first frequency, outputting the compensation data signal based on a first gray value;

when the previous driving frequency has a second frequency higher than the first frequency, outputting the compensation data signal based on a second gray value which is smaller than the first gray value and the gray value has.

25. The method of claim 21, further comprising:

receiving the compensation signal; and adjusting a voltage level of a voltage to be provided to each of the plurality of pixels based on the compensation signal.

26. The method of claim 25, wherein, as the counting number increases, the voltage level of the voltage increases.

27. The method of claim 21, further comprising:

receiving the compensation signal; and adjusting a pulse width of an emission signal to be provided to each of the plurality of pixels based on the compensation signal.

28. The method of claim 27, wherein, as the counting number increases, a width of the pulse width becomes narrower.

* * * * *